United States Patent
Green et al.

(10) Patent No.: US 8,547,051 B2
(45) Date of Patent: Oct. 1, 2013

(54) CONTROLLER AND METHOD FOR TRANSITIONING BETWEEN CONTROL ANGLES

(75) Inventors: Charles E. Green, Fenton, MO (US); Joseph G. Marcinkiewicz, St. Peters, MO (US)

(73) Assignee: Emerson Climate Technologies, Inc., Sidney, OH (US)

(*) Notice: Subject to any disclaimer, the term of this patent is extended or adjusted under 35 U.S.C. 154(b) by 0 days.

(21) Appl. No.: 13/585,961

(22) Filed: Aug. 15, 2012

(65) Prior Publication Data

US 2012/0306414 A1 Dec. 6, 2012

Related U.S. Application Data

(63) Continuation of application No. 12/852,625, filed on Aug. 9, 2010, now Pat. No. 8,264,192.

(60) Provisional application No. 61/232,633, filed on Aug. 10, 2009.

(51) Int. Cl.
*H02P 27/00* (2006.01)
*H02M 1/42* (2007.01)

(52) U.S. Cl.
USPC ............. 318/799; 318/400.01; 318/400.02; 318/400.07

(58) Field of Classification Search
USPC .......... 318/400.01, 400.02, 400.04, 400.07, 318/400.09, 400.32, 400.37, 400.38, 400.39, 318/400.4, 400.42, 799, 806, 811, 798
See application file for complete search history.

(56) References Cited

U.S. PATENT DOCUMENTS

| 4,364,237 | A | 12/1982 | Cooper et al. |
| 4,370,564 | A | 1/1983 | Matsushita |

(Continued)

FOREIGN PATENT DOCUMENTS

| EP | 2276157 A1 | 1/2011 |
| EP | 2381568 A2 | 10/2011 |

(Continued)

OTHER PUBLICATIONS

Laszlo Huber et al. "Performance Evaluation of Bridgeless PFC Boost Rectifiers." Delta Products Corporation. Power Electronics Laboratory. Applied Power Electronics Conference, APEC 2007—Twenty Second Annual IEEE, IEEE, PI, Feb. 1, 2007. pp. 165-171.

(Continued)

*Primary Examiner* — Eduardo Colon Santana
(74) *Attorney, Agent, or Firm* — Harness, Dickey & Pierce, P.L.C.

(57) ABSTRACT

A system includes a control module that controls a motor based on a first rotor angle and an angle determination module that generates the first rotor angle. An estimator module determines an estimated rotor angle of the motor. A transition module generates a transition signal in response to convergence of the estimator module. The angle determination module initially generates the first rotor angle based on an open loop angle. In response to the transition signal, the angle determination module switches to generating the first rotor angle based on the estimated rotor angle and an offset value. The offset value is based on a difference between the estimated rotor angle and the open loop angle at the time when the transition signal is generated.

20 Claims, 12 Drawing Sheets

(56) References Cited

U.S. PATENT DOCUMENTS

| | | |
|---|---|---|
| 4,428,016 A | 1/1984 | Brasfield |
| 4,662,185 A | 5/1987 | Kobayashi et al. |
| 4,866,588 A | 9/1989 | Rene |
| 4,940,929 A | 7/1990 | Williams |
| 5,064,356 A | 11/1991 | Horn |
| 5,224,025 A | 6/1993 | Divan et al. |
| 5,320,506 A | 6/1994 | Fogt |
| 5,359,281 A | 10/1994 | Barrow et al. |
| 5,371,666 A | 12/1994 | Miller |
| 5,383,109 A | 1/1995 | Maksimovic et al. |
| 5,457,375 A | 10/1995 | Marcinkiewicz et al. |
| 5,461,263 A | 10/1995 | Helfrich |
| 5,483,136 A | 1/1996 | Marcinkiewicz |
| 5,502,630 A | 3/1996 | Rokhvarg |
| 5,565,752 A | 10/1996 | Jansen et al. |
| 5,605,053 A | 2/1997 | Otori |
| 5,656,915 A | 8/1997 | Eaves |
| 5,682,306 A | 10/1997 | Jansen |
| 5,742,151 A | 4/1998 | Hwang |
| 5,801,935 A | 9/1998 | Sugden et al. |
| 5,867,379 A | 2/1999 | Maksimovic et al. |
| 5,917,864 A | 6/1999 | Asahara |
| 5,977,660 A | 11/1999 | Mandalakas et al. |
| 6,026,006 A | 2/2000 | Jiang et al. |
| 6,091,215 A | 7/2000 | Lovett et al. |
| 6,109,048 A | 8/2000 | Kim |
| 6,181,120 B1 | 1/2001 | Hawkes et al. |
| 6,225,767 B1 | 5/2001 | Lovett et al. |
| 6,256,213 B1 | 7/2001 | Illingworth |
| 6,326,750 B1 | 12/2001 | Marcinkiewicz |
| 6,366,070 B1 | 4/2002 | Cooke et al. |
| 6,373,734 B1 | 4/2002 | Martinelli |
| 6,388,905 B2 | 5/2002 | Nakagawa |
| 6,396,229 B1 | 5/2002 | Sakamoto et al. |
| 6,404,154 B2 | 6/2002 | Marcinkiewicz et al. |
| 6,411,065 B1 | 6/2002 | Underwood et al. |
| 6,429,673 B1 | 8/2002 | Obata et al. |
| 6,441,580 B2 | 8/2002 | Marcinkiewicz |
| 6,594,158 B2 | 7/2003 | Batarseh et al. |
| 6,639,377 B2 | 10/2003 | Iwaji et al. |
| 6,657,877 B2 | 12/2003 | Kashima et al. |
| 6,731,083 B2 | 5/2004 | Marcinkiewicz |
| 6,756,757 B2 | 6/2004 | Marcinkiewicz et al. |
| 6,757,185 B2 | 6/2004 | Rojas Romero |
| 6,771,522 B2 | 8/2004 | Hayashi et al. |
| 6,828,751 B2 | 12/2004 | Sadasivam et al. |
| 6,912,142 B2 | 6/2005 | Keim et al. |
| 6,927,553 B2 | 8/2005 | Chen |
| 6,947,504 B1 | 9/2005 | Pettit |
| 7,061,212 B2 | 6/2006 | Phadke |
| 7,068,016 B2 | 6/2006 | Athari |
| 7,088,881 B2 | 8/2006 | Nir |
| 7,148,664 B2 | 12/2006 | Takahashi et al. |
| 7,151,359 B2 | 12/2006 | Randall et al. |
| 7,176,644 B2 | 2/2007 | Ueda et al. |
| 7,193,388 B1 | 3/2007 | Skinner et al. |
| 7,208,895 B2 | 4/2007 | Marcinkiewicz et al. |
| 7,295,452 B1 | 11/2007 | Liu |
| 7,342,379 B2 | 3/2008 | Marcinkiewicz et al. |
| 7,352,151 B2 | 4/2008 | Fujitsuna et al. |
| 7,359,224 B2 | 4/2008 | Li |
| 7,375,485 B2 | 5/2008 | Shahi et al. |
| 7,403,404 B2 | 7/2008 | Oka et al. |
| 7,495,410 B2 | 2/2009 | Zargari et al. |
| 7,583,049 B2 | 9/2009 | Marcinkiewicz et al. |
| 7,591,038 B2 | 9/2009 | Murray et al. |
| 7,626,349 B2 | 12/2009 | Marcinkiewicz et al. |
| 7,638,967 B2 | 12/2009 | Aizawa et al. |
| 7,667,423 B2 * | 2/2010 | Shahi et al. .................. 318/567 |
| 7,683,568 B2 | 3/2010 | Pande et al. |
| 7,694,538 B2 | 4/2010 | Thorn et al. |
| 7,733,044 B2 | 6/2010 | Nakamura et al. |
| 7,888,881 B2 | 2/2011 | Shteynberg et al. |
| 7,905,122 B2 | 3/2011 | Murray et al. |
| 7,908,893 B2 | 3/2011 | Thorn et al. |
| 2002/0149953 A1 | 10/2002 | Smedley et al. |
| 2003/0052640 A1 | 3/2003 | Iwaji et al. |
| 2003/0057912 A1 | 3/2003 | Iwaji et al. |
| 2003/0218444 A1 | 11/2003 | Marcinkiewicz et al. |
| 2004/0211009 A1 | 10/2004 | Murray et al. |
| 2004/0239296 A1 | 12/2004 | Turchi |
| 2004/0257028 A1 | 12/2004 | Schulz et al. |
| 2005/0046370 A1 | 3/2005 | Gallegos-Lopez et al. |
| 2005/0187752 A1 | 8/2005 | Colby et al. |
| 2005/0204482 A1 | 9/2005 | Murray et al. |
| 2006/0013024 A1 | 1/2006 | Temesi et al. |
| 2006/0097688 A1 | 5/2006 | Patel et al. |
| 2006/0125427 A1 | 6/2006 | Kishibe et al. |
| 2006/0130504 A1 | 6/2006 | Agrawal et al. |
| 2006/0290302 A1 | 12/2006 | Marcinkiewicz et al. |
| 2006/0290304 A1 | 12/2006 | Marcinkiewicz et al. |
| 2007/0120519 A1 | 5/2007 | Sakamoto et al. |
| 2007/0170880 A1 | 7/2007 | Shahi et al. |
| 2008/0002444 A1 | 1/2008 | Shekhawat et al. |
| 2008/0031021 A1 | 2/2008 | Ros et al. |
| 2008/0143289 A1 | 6/2008 | Marcinkiewicz et al. |
| 2008/0185986 A1 | 8/2008 | Marcinkiewicz et al. |
| 2008/0246445 A1 | 10/2008 | Wrathall |
| 2008/0278101 A1 * | 11/2008 | Shahi et al. .............. 318/400.11 |
| 2008/0284401 A1 | 11/2008 | Oettinger et al. |
| 2008/0310200 A1 | 12/2008 | Maksimovic et al. |
| 2009/0021208 A1 | 1/2009 | Romenesko et al. |
| 2009/0122582 A1 | 5/2009 | Ye et al. |
| 2009/0153113 A1 | 6/2009 | Zilberberg |
| 2009/0174262 A1 | 7/2009 | Martin et al. |
| 2009/0243561 A1 | 10/2009 | Tan et al. |
| 2009/0303764 A1 | 12/2009 | Jin et al. |
| 2010/0080026 A1 | 4/2010 | Zhang |
| 2010/0246228 A1 | 9/2010 | Kazlauskas |
| 2010/0292943 A1 | 11/2010 | Minor et al. |
| 2011/0031920 A1 * | 2/2011 | Henderson et al. ........... 318/434 |
| 2011/0031943 A1 | 2/2011 | Green |
| 2011/0075462 A1 | 3/2011 | Wildash |
| 2011/0127938 A1 | 6/2011 | Kawakami et al. |
| 2011/0156619 A1 | 6/2011 | Nomura |
| 2011/0175560 A1 | 7/2011 | Akiyama |
| 2012/0206077 A1 * | 8/2012 | Yoneshima et al. ..... 318/400.33 |

FOREIGN PATENT DOCUMENTS

| | | |
|---|---|---|
| JP | 08249067 A | 9/1996 |
| JP | 09062363 A | 3/1997 |
| JP | 09308283 A | 11/1997 |
| JP | 2000044135 A | 2/2000 |
| JP | 2000199780 A | 7/2000 |
| JP | 2002199780 A | 7/2002 |
| JP | 2003018704 A | 1/2003 |
| JP | 2004112942 A | 4/2004 |
| JP | 2007259686 A | 10/2007 |
| KR | 19980080006 A | 6/2002 |
| KR | 20060009199 A | 1/2006 |
| KR | 20060129272 A | 12/2006 |
| KR | 20070064726 A | 6/2007 |
| KR | 20080060290 A | 7/2008 |

OTHER PUBLICATIONS

Extended European Search Report regarding Application No. 10808617.4-1242 / 2465187, dated Jan. 30, 2013.
International Search Report regarding Application No. PCT/US2010/045041, mailed Feb. 22, 2011.
Written Opinion of the International Searching Authority regarding Application No. PCT/US2010/045041, mailed Feb. 22, 2011.
Notice of Allowance and Fees Due regarding U.S. Appl. No. 12/852,625, dated Mar. 15, 2012.
International Search Report regarding Application No. PCT/US2010/044982, mailed Feb. 23, 2011.
Written Opinion of the International Searching Authority regarding Application No. PCT/US2010/044982, mailed Feb. 23, 2011.
International Search Report regarding Application No. PCT/US2010/045046, mailed Apr. 6, 2011.
Written Opinion of the International Searching Authority regarding Application No. PCT/US2010/045046, mailed Apr. 6, 2011.
International Seach Report regarding Application No. PCT/US2010/044991, mailed Apr. 22, 2011.

Written Opinion of the International Searching Authority regarding Application No. PCT/US2010/044991, mailed Apr. 22, 2011.
International Search Report regarding Application No. PCT/US2010/044993, mailed Apr. 25, 2011.
Written Opinion of the International Searching Authority regarding Application No. PCT/US2010/044993, mailed Apr. 25, 2011.
International Search Report regarding Application No. PCT/US2010/044998, Apr. 21, 2011.
Written Opinion of the International Searching Authority regarding Application No. PCT/US2010/044998, mailed Apr. 21, 2011.
Written Opinion of the International Searching Authority regarding Application No. PCT/US2010/045005, mailed Apr. 25, 2011.
International Search Report regarding Application No. PCT/US2010/045005, mailed Apr. 25, 2011.
Written Opinion of the International Searching Authority regarding Application No. PCT/US2010/045025, mailed Apr. 18, 2011.
International Search Report regarding Application No. PCT/US2010/045025, mailed Apr. 18, 2011.
International Search Report regarding Application No. PCT/US2010/045032, mailed Apr. 25, 2011.
Written Opinion of the International Searching Authority regarding Application No. PCT/US2010/045032, mailed Apr. 25, 2011.
"Power-Factor Correction with Interieved Boost Converters in Continuous-Inductor-Current Mode," Laszlo Balogh and Richard Redl, IEEE 1993.
"Advantages of Interleaved Boost Converters for PFC," Michael O'Loughlin, Texas Instruments, Mar. 30, 2006.
"2nd Generation of PFC Solutions," Michael Frisch, Temesi Erno, Yu Jinghui, Tyco Electronics/Power Systems, Sep. 2004.
Notice of Allowance and Fee(s) Due and Notice of Allowability regarding U.S. Appl. No. 12/852,549, dated Apr. 2, 2012.
"Real-Time Computer Control: An Introduction," Bennett, S., Prentice Hall International (UK) Ltd., Chapter 2 (pp. 19-47) and Chapter 4 (pp. 99-128), 1988.
Notice of Allowance regarding U.S. Appl. No. 12/852,585, dated Aug. 28, 2012.
Notice of Allowance and Fee(s) Due regarding U.S. Appl. No. 12/852,553, dated Sep. 21, 2012.
Office Action regarding U.S. Appl. No. 12/852,565, dated Oct. 15, 2012.
Baggio, J.E., et al., "Discrete control for three-level boost PFC converter," Telecommunications Energy Conference, 2002. INTELEC. 24th Annual International, pp. 627-633,2002. doi: 10.1109/INTLEC. 2002.1048772; URL: http://ieeexplore.ieee.org/stamp/stamp.jsp?tp=&arnumber=1048722&isnumber=22440.
Notice of Allowance and Fee(s) Due regarding U.S. Appl. No. 12/852,578, dated Nov. 23, 2012.
Korean Decision for Patent Grant regarding Application No. 10-2012-7006166, dated Jun. 26, 2013.

* cited by examiner

CONTROLLER AND METHOD FOR TRANSITIONING BETWEEN CONTROL ANGLES

CROSS-REFERENCE TO RELATED APPLICATIONS

This application is a continuation of U.S. patent application Ser. No. 12/852,625, filed on Aug. 9, 2010, which claims the benefit of U.S. Provisional Application No. 61/232,633, filed on Aug. 10, 2009. The entire disclosures of the above applications are incorporated herein by reference.

FIELD

The present disclosure relates to electric motor control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

Power factor is an indicator of the relationship between current and voltage in a circuit, or how effectively a circuit uses real power compared to storing and returning energy to the power source. Power factor may be expressed as a value between zero and one. The circuit's use of actual real power divided by the total volt amps drawn by the circuit may increase as the power factor approaches one. In various implementations, a power factor correction (PFC) system may be implemented. PFC systems generally operate to increase a circuit's power factor toward one, thereby increasing the circuit's use of real power as compared with the amount of reactive power the circuit stores and returns to the source.

SUMMARY

A system includes a pulse-width modulation (PWM) module, a subtraction module, an error reducing module, and a summing module. The PWM module controls switching of an inverter that powers a motor. The PWM module controls the switching based on a first angle in a first mode and a second angle in a second mode. The subtraction module determines a difference between the first and second angles. The error reducing module (i) stores the difference when a transition from the first mode to the second mode is commanded and (ii) decreases a magnitude of the stored difference to zero. The summing module calculates a sum of the stored difference and the second angle. The PWM module controls the switching based on the sum in the second mode.

In other features, the system further comprises a commanded angle generation module. The commanded angle generation module generates the first angle based on a commanded speed.

In still other features, the first angle is generated by integrating the commanded speed.

In further features, the system further comprises a rate limiting module. The rate limiting module generates the commanded speed by rate limiting a requested speed.

In still further features, the system further comprises an estimator module. The estimator module determines the second angle based on measured parameters of the motor. The measured parameters include at least one of measured currents and measured voltages.

In other features, the estimator module determines an estimated speed. The PWM module controls the switching based on the estimated speed after the transition from the first mode to the second mode.

In still other features, the error reducing module decreases the magnitude by a predetermined amount at periodic intervals.

In further features, the system further comprises a transition module. The transition module commands the transition from the first mode to the second mode when an estimated speed of the motor is greater than a predetermined speed.

In still further features, the system further comprises a transition module. The transition module commands the transition from the first mode to the second mode when the motor has been running for longer than a predetermined period.

A method includes: controlling switching of an inverter that powers a motor based on a first angle in a first mode and a second angle in a second mode; determining a difference between the first and second angles; storing the difference when a transition from the first mode to the second mode is commanded; decreasing a magnitude of the stored difference to zero; calculating a sum of the stored difference and the second angle; and controlling the switching based on the sum in the second mode.

In other features, the method further includes generating the first angle based on a commanded speed.

In still other features, the method further includes generating the first angle by integrating the commanded speed.

In further features, the method further includes generating the commanded speed by rate limiting a requested speed.

In still further features, the method further includes determining the second angle based on measured parameters of the motor. The measured parameters include at least one of measured currents and measured voltages.

In other features, the method further includes determining an estimated speed and controlling the switching based on the estimated speed after the transition from the first mode to the second mode.

In still other features, the method further includes decreasing the magnitude by a predetermined amount at periodic intervals.

In further features, the method further includes commanding the transition from the first mode to the second mode when an estimated speed of the motor is greater than a predetermined speed.

In still further features, the method further includes commanding the transition from the first mode to the second mode when the motor has been running for longer than a predetermined period.

A system includes a control module, an angle determination module, and a reducing module. The control module controls a motor based on a first rotor angle in a first mode and controls the motor based on a second rotor angle in a second mode. The angle determination module (i) determines the second rotor angle based on a sum of a stored value and a third rotor angle and (ii) after the second mode is selected, sets the stored value to a difference between the first rotor angle and the third rotor angle. The reducing module reduces a magnitude of the stored value to zero over a non-zero period after the second mode is selected.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
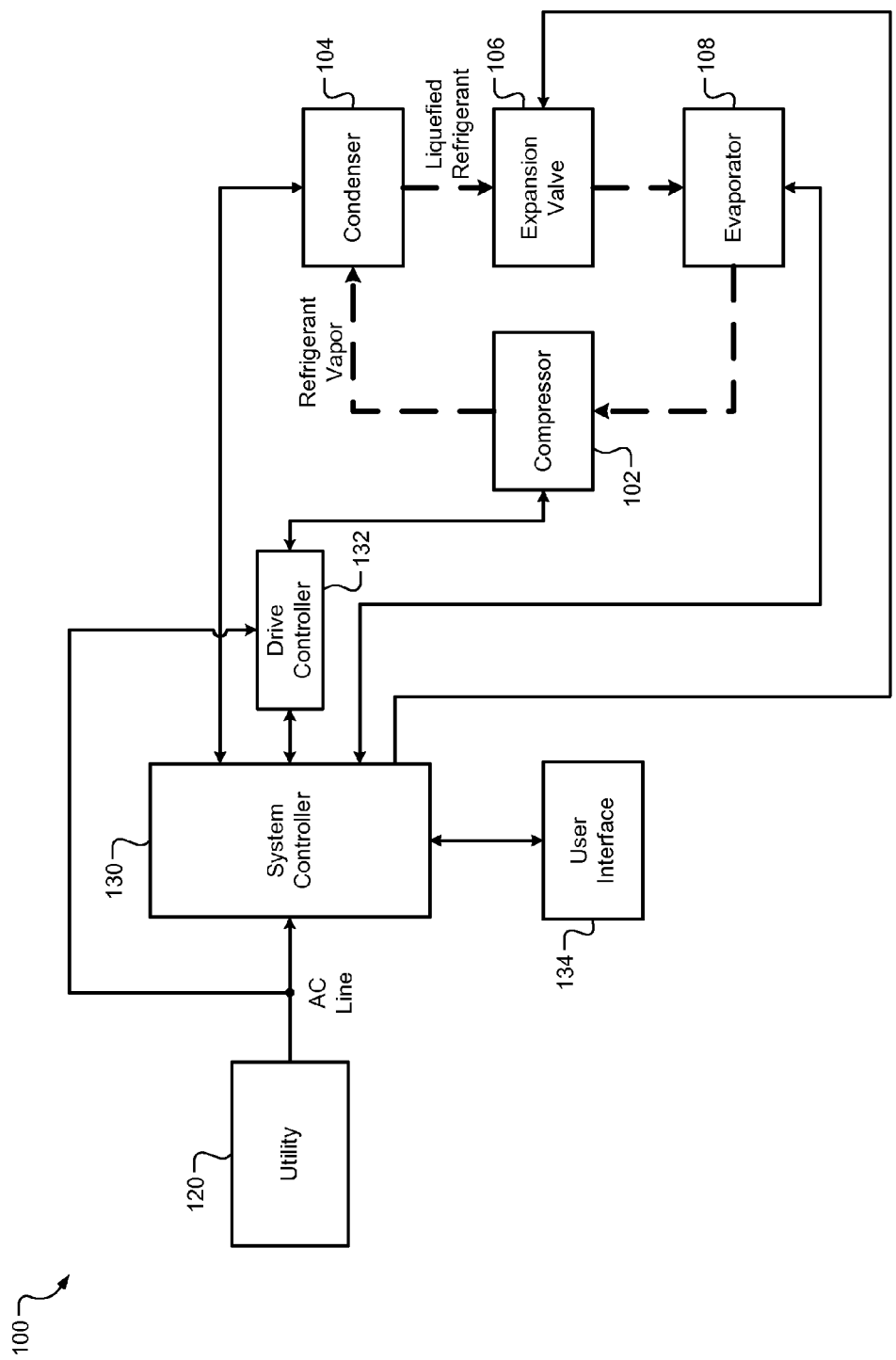
FIG. 1 is a functional block diagram of an exemplary refrigeration system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of a refrigeration system 100 is presented. The refrigeration system 100 may include a compressor 102, a condenser 104, an expansion valve 106, and an evaporator 108. According to the principles of the present disclosure, the refrigeration system 100 may include additional and/or alternative components. In addition, the present disclosure is applicable to other suitable types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts (V) root mean squared (RMS) or at another suitable voltage. In various implementations, the utility 120 may provide three-phase power at approximately 400 Volts RMS or 480 Volts RMS at a line frequency of, for example, 50 or 60 Hz. The utility 120 may provide the AC power to the system controller 130 via an AC line. The AC power may also be provided to a drive controller 132 via the AC line.

The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs to the drive controller 132. The user inputs may include, for example, a desired temperature, requests regarding operation of a fan (e.g., the evaporator fan), and/or other suitable inputs. The system controller 130 may control operation of the fans of the condenser 104, the evaporator 108, and/or the expansion valve 106.

The drive controller 132 may control the compressor 102 based on commands from the system controller 130. For example only, the system controller 130 may instruct the drive controller 132 to operate the compressor motor at a certain speed. In various implementations, the drive controller 132 may also control the condenser fan.

Figure 2:
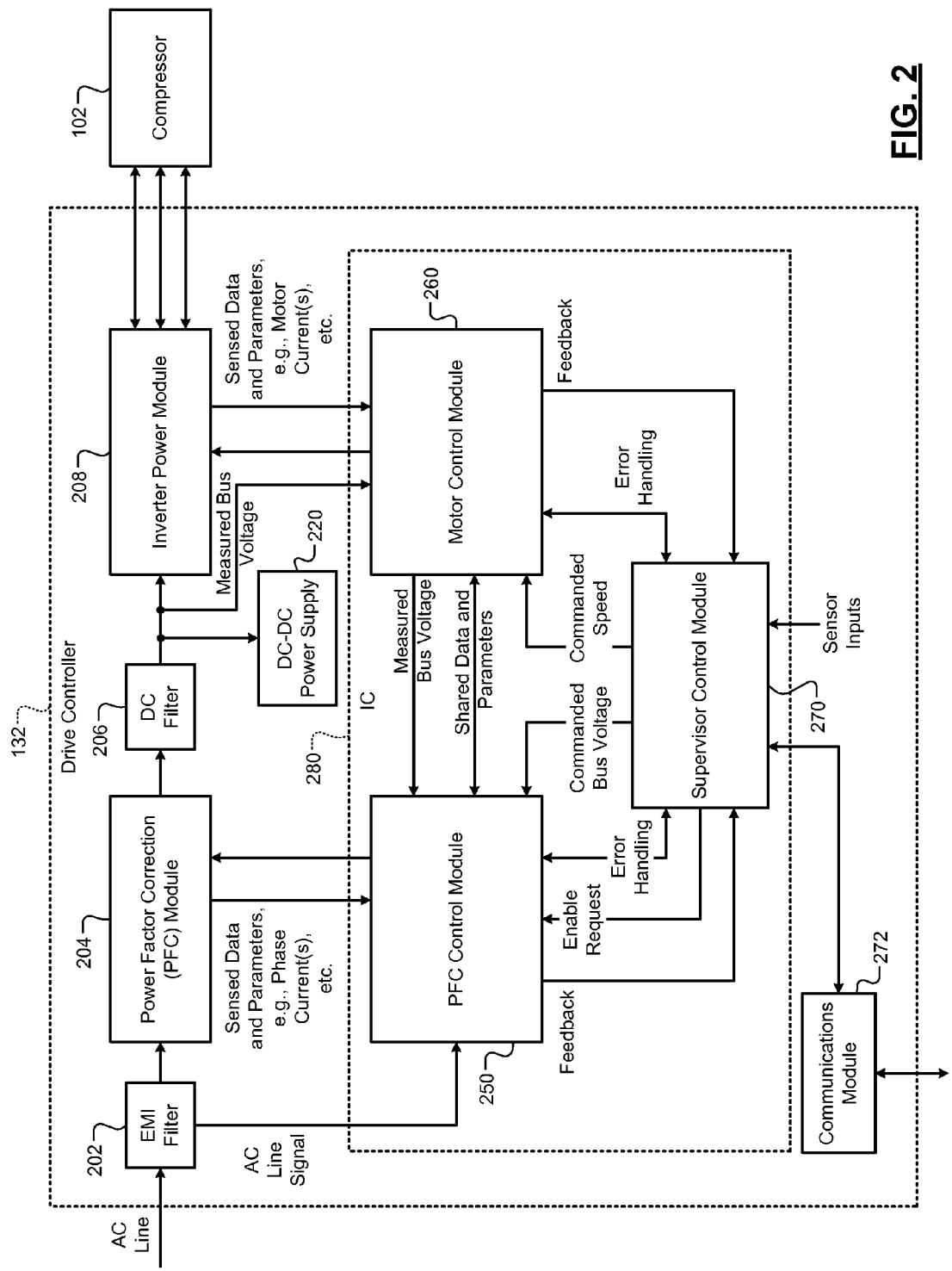
FIG. 2 is a functional block diagram of an exemplary drive controller and an exemplary compressor.

Referring now to FIG. 2, a functional block diagram of the drive controller 132 and the compressor 102 is presented. An electromagnetic interference (EMI) filter 202 reduces EMI that might otherwise be injected back onto the AC line by the drive controller 132. The EMI filter 202 may also filter EMI carried on the AC line.

A power factor correction (PFC) module 204 receives AC power from the AC line as filtered by the EMI filter 202. The PFC module 204 (described in more detail with reference to FIGS. 3a, 3b, and 3c) rectifies the AC power, thereby converting the AC input power into direct current (DC) power. The generated DC power is provided at positive and negative terminals of the PFC module 204. The PFC module 204 also selectively provides power factor correction between the input AC power and the generated DC power.

The PFC module 204 selectively boosts the AC power to a DC voltage that is greater than a peak voltage of the AC power. For example only, the PFC module 204 may operate in a passive mode, where the DC voltage generated is less than a peak voltage of the AC power. The PFC module 204 may also operate in an active mode, where the DC voltage generated is greater than the peak voltage of the AC power. A DC voltage that is greater than the peak voltage of the AC power may be referred to as a boosted DC voltage.

AC power having an RMS voltage of 230 V has a peak voltage of approximately 325 V (230 V multiplied by the square root of 2). For example only, when operating from AC power having an RMS voltage of 230 V, the PFC module 204 may generate boosted DC voltages between approximately 350 V and approximately 410 V. For example only, the lower limit of 350 V may be imposed to avoid unstable operating regimes of the PFC module 204. The limits may vary, such as with the actual AC input voltage value. In various implementations, the PFC module 204 may be able to achieve higher boosted DC voltages than 410 V. However, the upper limit may be imposed to improve long-term reliability of components that would experience greater stress at higher voltages, such as components in a DC filter 206. In various implementations, the upper and/or lower limits may be varied.

The DC filter 206 filters the DC power generated by the PFC module 204. The DC filter 206 minimizes ripple voltage present in the DC power that results from the conversion of AC power to DC power. In various implementations, the DC filter 206 may include one or more series or parallel filter capacitors connected between the positive and negative terminals of the PFC module 204. In such implementations, the positive and negative terminals of the PFC module 204 may be connected directly to positive and negative terminals of an inverter power module 208.

The inverter power module 208 (described in more detail with reference to FIGS. 4a, 4b, and 4c) converts the DC power, as filtered by the DC filter 206, into AC power that is provided to the compressor motor. For example only, the inverter power module 208 may convert the DC power into three-phase AC power and provide the phases of the AC power to three respective windings of the motor of the compressor 102. In other implementations, the inverter power module 208 may convert the DC power into more or fewer phases of power.

A DC-DC power supply 220 may also receive the filtered DC power. The DC-DC power supply 220 converts the DC power into one or more DC voltages that are suitable for various components and functions. For example only, the DC-DC power supply 220 may reduce the voltage of the DC power to a first DC voltage that is suitable for powering digital logic and a second DC voltage that is suitable for controlling switches within the PFC module 204. For example only, the second DC voltage may be selectively applied to gate terminals of the switches. In various implementations, DC power may be provided by another DC power source (not shown)—for example, a DC voltage derived via a transformer from the main 230 VAC input.

In various implementations, the first DC voltage may be approximately 3.3 V and the second DC voltage may be approximately 15 V. In various implementations, the DC-DC power supply 220 may also generate a third DC voltage. For example only, the third DC voltage may be approximately 1.2 V. The third DC voltage may be derived from the first DC voltage using a voltage regulator. For example only, the third DC voltage may be used for core digital logic and the first DC voltage may be used for input/output circuitry of a PFC control module 250 and a motor control module 260.

The PFC control module 250 controls the PFC module 204, and the motor control module 260 controls the inverter power module 208. In various implementations, the PFC control module 250 controls switching of the switches within the PFC module 204, and the motor control module 260 controls switching of switches within the inverter power module 208. The PFC module 204 may be implemented with 1, 2, 3, or more phases.

A supervisor control module 270 may communicate with the system controller 130 via a communications module 272. The communications module 272 may include an input/output port and other suitable components to serve as an interface between the system controller 130 and the supervisor control module 270. The communications module 272 may implement wired and/or wireless protocols.

The supervisor control module 270 provides various commands to the PFC control module 250 and the motor control module 260. For example, the supervisor control module 270 may provide a commanded speed to the motor control module 260. The commanded speed corresponds to a desired rotational speed of the motor of the compressor 102.

In various implementations, the commanded compressor speed may be provided to the supervisor control module 270 by the system controller 130. In various implementations, the supervisor control module 270 may determine or adjust the commanded compressor speed based on inputs provided via the communications module 272 and/or parameters measured by various sensors (i.e., sensor inputs). The supervisor control module 270 may also adjust the commanded compressor speed based on feedback from the PFC control module 250 and/or the motor control module 260.

The supervisor control module 270 may also provide other commands to the PFC control module 250 and/or the motor control module 260. For example, based on the commanded speed, the supervisor control module 270 may command the PFC control module 250 to produce a commanded bus voltage. The supervisor control module 270 may adjust the commanded bus voltage based on additional inputs, such as operating parameters of the inverter power module 208 and the measured voltage of the incoming AC line.

The supervisor control module 270 may diagnose faults in various systems of the drive controller 132. For example only, the supervisor control module 270 may receive fault information from the PFC control module 250 and/or the motor control module 260. The supervisor control module 270 may also receive fault information via the communications module 272. The supervisor control module 270 may manage reporting and clearing of faults between the drive controller 132 and the system controller 130.

Responsive to the fault information, the supervisor control module 270 may instruct the PFC control module 250 and/or the motor control module 260 to enter a fault mode. For example only, in the fault mode, the PFC control module 250 may halt switching of the switches of the PFC module 204, while the motor control module 260 may halt switching of the switches of the inverter power module 208. In addition, the motor control module 260 may directly provide fault information to the PFC control module 250. In this way, the PFC control module 250 can respond to a fault identified by the motor control module 260 even if the supervisor control module 270 is not operating correctly and vice versa.

The PFC control module 250 may control switches in the PFC module 204 using pulse width modulation (PWM). More specifically, the PFC control module 250 may generate PWM signals that are applied to the switches of the PFC module 204. The duty cycle of the PWM signals is varied to produce desired currents in the switches of the PFC module 204. The desired currents are calculated based on an error between the measured DC bus voltage and a desired DC bus voltage. In other words, the desired currents are calculated in order to achieve the desired DC bus voltage. The desired currents may also be based on achieving desired power factor correction parameters, such as the shapes of current waveforms in the PFC module 204. The PWM signals generated by the PFC control module 250 may be referred to as PFC PWM signals.

The motor control module 260 may control switches in the inverter power module 208 using PWM in order to achieve the commanded compressor speed. The PWM signals generated by the motor control module 260 may be referred to as inverter PWM signals. The duty cycle of the inverter PWM signals controls the current through the windings of the motor (i.e., motor currents) of the compressor 102. The motor currents control motor torque, and the motor control module 260 may control the motor torque to achieve the commanded compressor speed.

In addition to sharing fault information, the PFC control module 250 and the motor control module 260 may also share data. For example only, the PFC control module 250 may receive data from the motor control module 260 such as load, motor currents, estimated motor torque, inverter temperature, duty cycle of the inverter PWM signals, and other suitable parameters. The PFC control module 250 may also receive data from the motor control module 260, such as the measured DC bus voltage. The motor control module 260 may receive data from the PFC control module 250 such as AC line voltage, current(s) through the PFC module 204, estimated AC power, PFC temperature, commanded bus voltage, and other suitable parameters.

In various implementations, some or all of the PFC control module 250, the motor control module 260, and the supervisor control module 270 may be implemented on an integrated circuit (IC) 280. For example only, the IC 280 may include a digital signal processor (DSP), a field programmable gate array (FPGA), a microprocessor, etc. In various implementations, additional components may be included in the IC 280. Additionally, various functions shown inside the IC 280 in FIG. 2 may be implemented external to the IC 280, such as in a second IC or in discrete circuitry. For example only, the supervisor control module 270 may be integrated with the motor control module 260.

Figure 3A:
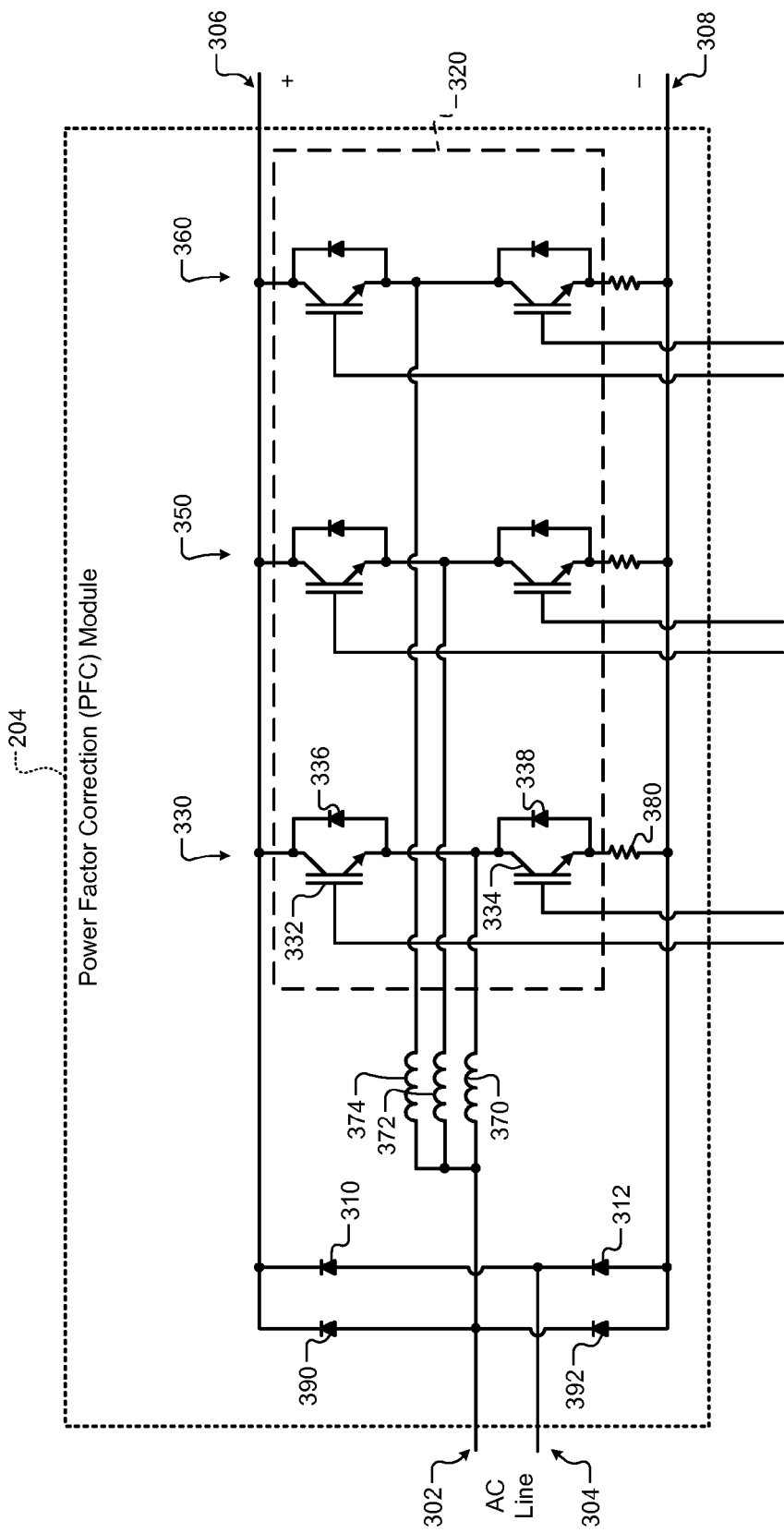
FIGS. 3a-3c are simplified schematics of exemplary power factor correction (PFC) modules.

FIG. 3a is a schematic of an example implementation of the PFC module 204. The PFC module 204 receives AC power via first and second AC input terminals 302 and 304. The AC power may be, for example, the AC power output by the EMI filter 202. In various implementations, the signals at the first and second AC input terminals 302 and 304 may both be time-varying with respect to an earth ground. The PFC module 204 outputs DC power to the DC filter 206 and the inverter power module 208 via a positive DC terminal 306 and a negative DC terminal 308.

An anode of a first rectifier diode 310 is connected to the second AC input terminal 304, and a cathode of the first rectifier diode 310 is connected to the positive DC terminal 306. An anode of a second rectifier diode 312 is connected to the negative DC terminal 308, and a cathode of the second rectifier diode 312 is connected to the second AC input terminal 304. Each of the rectifier diodes 310 and 312 may be implemented as one or more individual series or parallel diodes.

A switch block 320 is connected between the positive and negative DC terminals 306 and 308. The switch block 320 includes a first PFC leg 330 that includes first and second switches 332 and 334. The switches 332 and 334 each include a first terminal, a second terminal, and a control terminal. In various implementations, each of the switches 332 and 334 may be implemented as an insulated gate bipolar transistor (IGBT). In such implementations, the first, second, and control terminals may correspond to collector, emitter, and gate terminals, respectively.

The first terminal of the first switch 332 is connected to the positive DC terminal 306. The second terminal of the first switch 332 is connected to the first terminal of the second switch 334. The second terminal of the second switch 334 may be connected to the negative DC terminal 308. In various implementations, the second terminal of the second switch 334 may be connected to the negative DC terminal 308 via a shunt resistor 380 to enable measuring current flowing through the first PFC leg 330.

The control terminals of the switches 332 and 334 receive generally complementary PFC PWM signals from the PFC control module 250. In other words, the PFC PWM signal provided to the first switch 332 is opposite in polarity to the PFC PWM signal provided to the second switch 334. Short circuit current may flow when the turning on of one of the switches 332 and 334 overlaps with the turning off of the other of the switches 332 and 334. Therefore, both the switches 332 and 334 may be turned off during a deadtime before either one of the switches 332 and 334 is turned on. Therefore, generally complementary means that two signals are opposite for most of their periods. However, around transitions, both signals may be low or high for some overlap period.

The first PFC leg 330 may also include first and second diodes 336 and 338 connected anti-parallel to the switches 332 and 334, respectively. In other words, an anode of the first diode 336 is connected to the second terminal of the first switch 332, and a cathode of the first diode 336 is connected to the first terminal of the first switch 332. An anode of the second diode 338 is connected to the second terminal of the second switch 334, and a cathode of the second diode 338 is connected to the first terminal of the second switch 334.

The switch block 320 may include one or more additional PFC legs. In various implementations, the switch block 320 may include one additional PFC leg. As shown in FIG. 3a, the switch block 320 includes second and third PFC legs 350 and 360. The number of PFC legs included in the switch block 320 may be chosen based on performance and cost. For example only, the magnitude of ripple (voltage and current) in the DC output of the PFC module 204 may decrease as the number of PFC legs increases. In addition, the amount of ripple current in the AC line current may decrease as the number of PFC legs increase. However, parts costs and implementation complexity may increase as the number of PFC legs increases.

The second and third PFC legs 350 and 360 of the switch block 320 may be similar to the first PFC leg 330. For example only, the second and third PFC legs 350 and 360 may each include respective components for the switches 332 and 334, the diodes 336 and 338, and respective shunt resisters connected in the same manner as the first PFC leg 330.

The PFC PWM signals provided to the switches of the additional PFC legs may also be complementary in nature. The PFC PWM signals provided to the additional PFC legs may be phase shifted from each other and from the PFC PWM signals provided to the first PFC leg 330. For example only, the phase shift of the PFC PWM signals may be determined by dividing 360 degrees (°) by the number of PFC legs. For example, when the switch block 320 includes three PFC legs, the PFC PWM signals may be phase shifted from each other by 120° (or 180° for two phases, or 90° for four phases, etc.). Phase shifting the PFC PWM signals may cancel ripple in the AC line current as well as the DC output.

The PFC module 204 includes a first inductor 370. The first inductor 370 is connected between the first AC input terminal 302 and the second terminal of the first switch 332. Additional inductors may connect the first AC input terminal 302 to additional PFC legs. For example only, FIG. 3a shows a second inductor 372 and a third inductor 374 connecting the first AC input terminal 302 to the second and third PFC legs 350 and 360, respectively.

A voltage may be measured across the shunt resistor 380 to determine current through the first PFC leg 330 according to Ohm's law. An amplifier (not shown), such as an operational amplifier, may amplify the voltage across the shunt resistor 380. The amplified voltage may be digitized, buffered, and/or filtered to determine the current through the first PFC leg 330. Current through other PFC legs may be determined using respective shunt resistors.

Figure 3B:
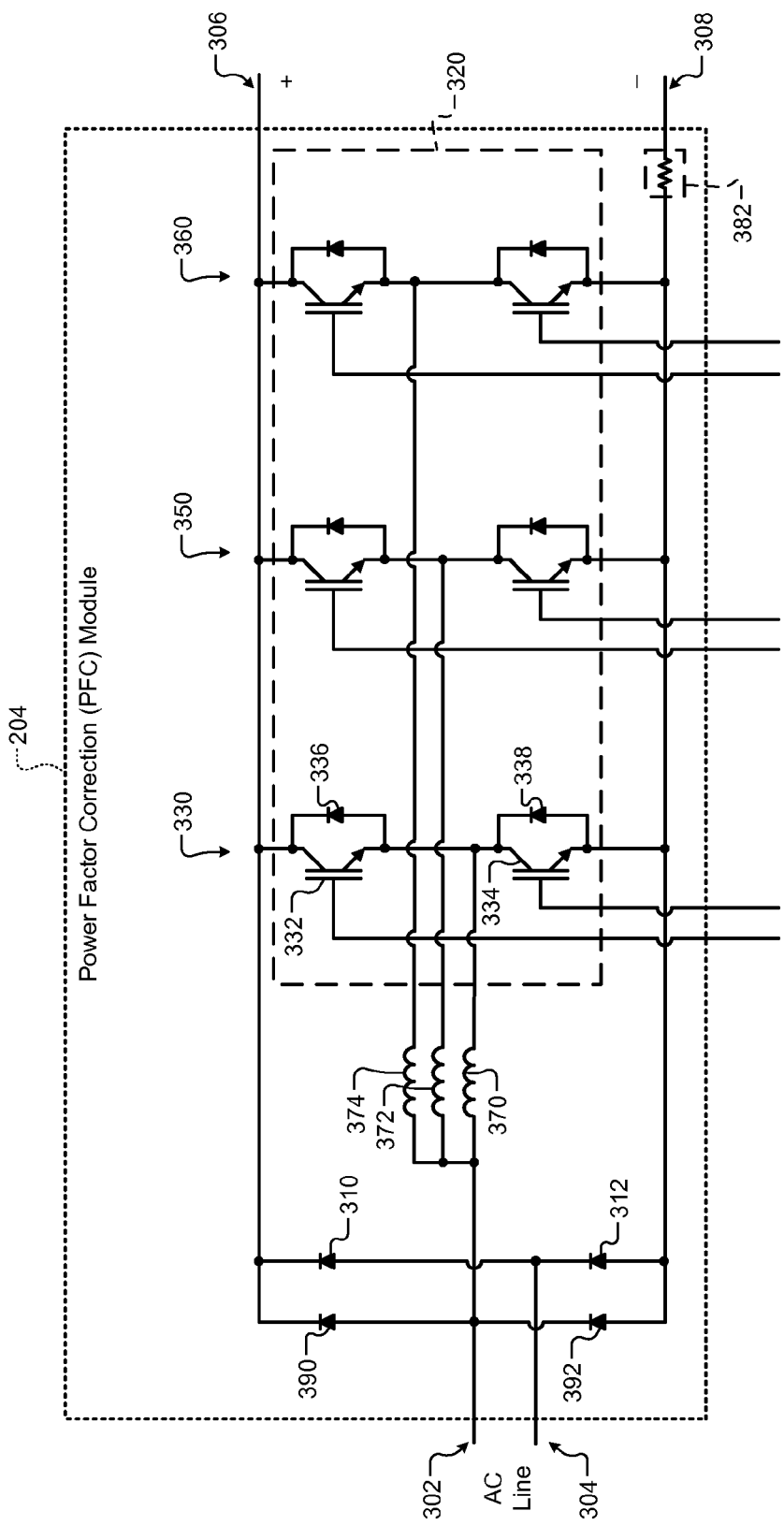

Additionally or alternatively, a resistor 382 may be connected in series with the negative DC terminal 308, as shown in FIG. 3b. Current through the resistor 382 may therefore indicate a total current output from the PFC module 204. Current through each of the PFC legs 330, 350, and 360 may be inferred from the total current based on the known phase timing of the current through the PFC legs 330, 350, and 360.

Figure 3C:
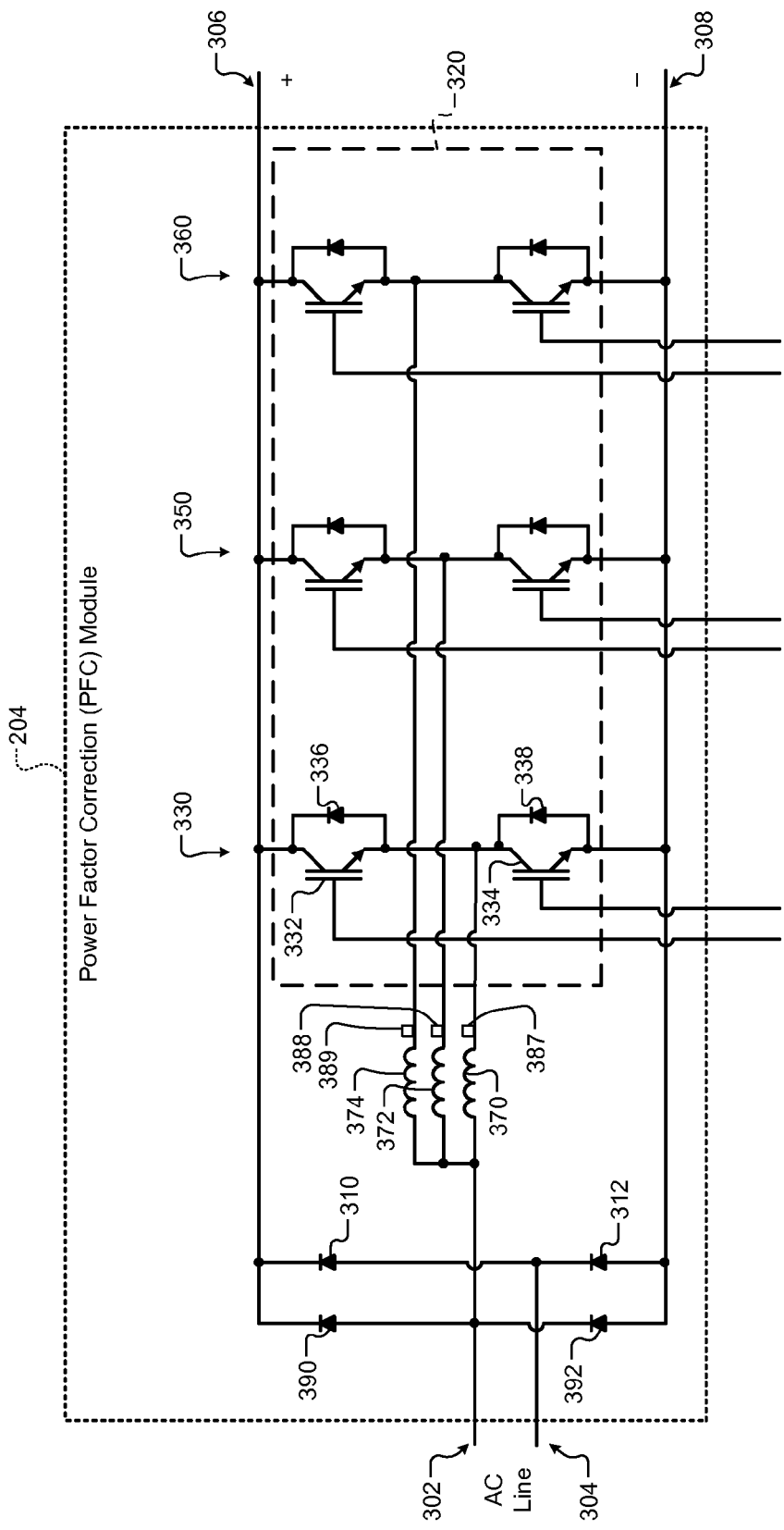

Any method of measuring or sensing current through any or all of the PFC legs 330, 350, 360 may be used. For example, in various implementations, the current through the first PFC leg 330 may be measured using a current sensor 387 (as shown in FIG. 3c). For example only, the current sensor 387 may be implemented in series with the first inductor 370. In various implementations, the current sensor 387 may include a Hall-effect sensor that measures the current through the first PFC leg 330 based on magnetic flux around the first inductor 370. Current through the PFC legs 350 and 360 may also be measured using associated current sensors 388 and 389, respectively.

The PFC module 204 may also include first and second bypass diodes 390 and 392. An anode of the first bypass diode 390 is connected to the first AC input terminal 302, and a cathode of the first bypass diode 390 is connected to the positive DC terminal 306. An anode of the second bypass diode 392 is connected to the negative DC terminal 308, and a cathode of the second bypass diode 392 is connected to the first AC input terminal 302.

The bypass diodes 390 and 392 may be power diodes, which may be designed to operate at low frequencies, such as, for example, frequencies less than approximately 100 Hz or approximately 200 Hz. Resistance of the bypass diodes 390 and 392 may be less than resistance of the inductors 370, 372, and 374. Therefore, when the switches 332 and 334 within the switch block 320 are not being switched, current may flow through the bypass diodes 390 and 392 instead of the diodes 336 and 338.

When the PFC module 204 is operating to create a boosted DC voltage, the boosted DC voltage will be greater than a peak voltage on the AC line. The bypass diodes 390 and 392 will therefore not be forward biased and will remain inactive. The bypass diodes 390 and 392 may provide lightning strike protection and power surge protection.

In various implementations, the bypass diodes 390 and 392 may be implemented with the rectifier diodes 310 and 312 in a single package. For example only, Vishay model number 26MT or 36MT or International Rectifier, model number 26 MB or 36 MB may be used as the bypass diodes 390 and 392 and the rectifier diodes 310 and 312. The rectifier diodes 310 and 312 carry current whether the PFC module 204 is generating a boosted DC voltage or not. Therefore, in various implementations, each of the rectifier diodes 310 and 312 may be implemented as two physical diodes connected in parallel. Current sensors may be used to measure PFC phase currents in series with the inductors 370, 372, and 374.

Figure 4A:
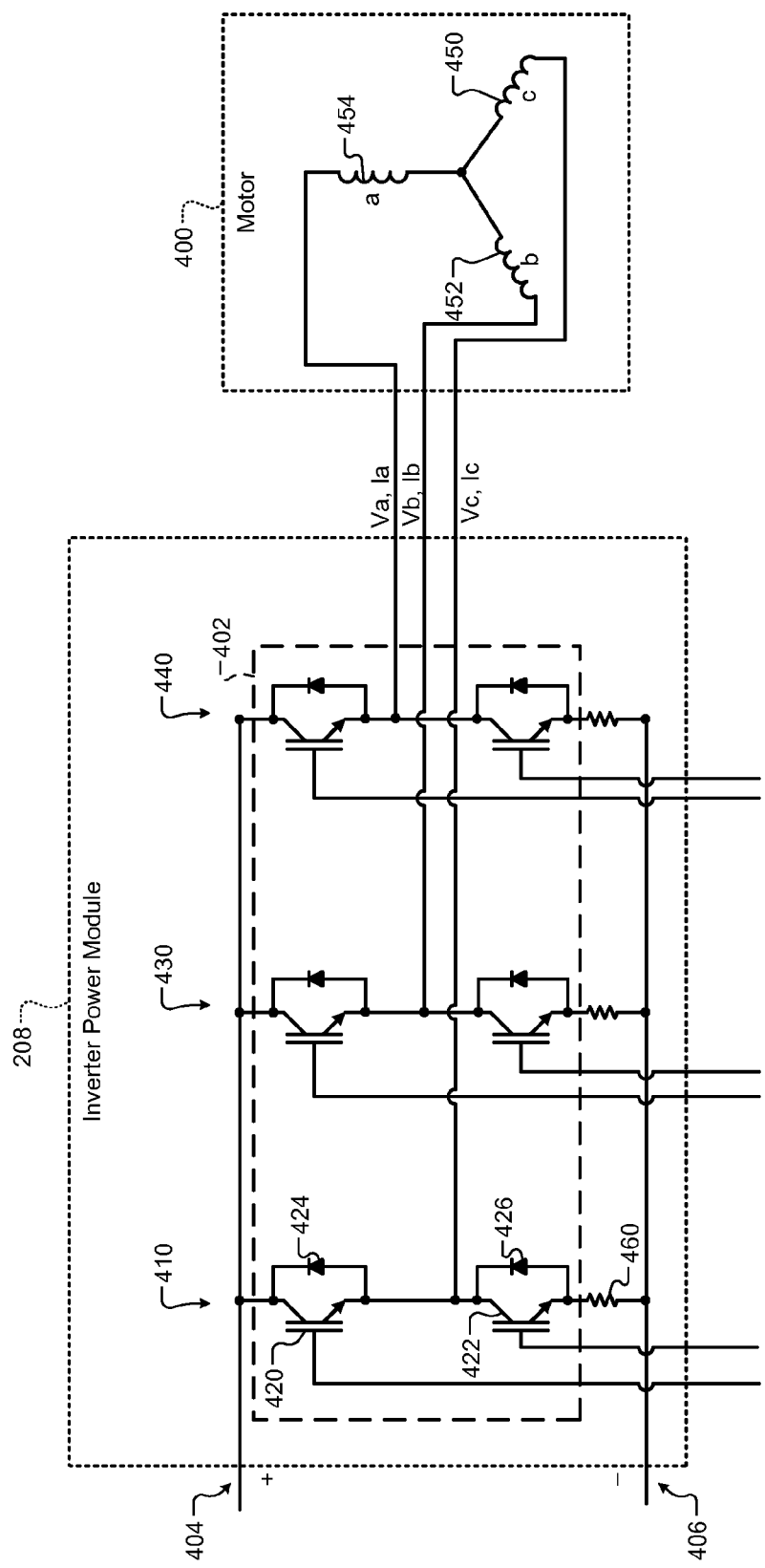
FIGS. 4a-4c are simplified schematics of exemplary inverter power modules and exemplary motors.

Referring now to FIG. 4a, a simplified schematic of a motor 400 and an example implementation of the inverter power module 208 is presented. The motor 400 is a component of the compressor 102 of FIG. 2. However, the principles of FIGS. 4a-4c may apply to other motors, including a motor of the condenser 104. The inverter power module 208 includes a switch block 402. In various implementations, the switch block 402 and the switch block 320 of the PFC module 204 may be implemented using a similar part. For example only, in FIG. 4a, a first inverter leg 410 includes first and second switches 420 and 422 and first and second diodes 424 and 426, which are arranged similarly to the switches 332 and 334 and the diodes 336 and 338 of FIG. 3a.

The switch block 402 receives the filtered DC voltage from the DC filter 206 via a positive DC terminal 404 and a negative DC terminal 406. The first terminal of the first switch 420 may be connected to the positive DC terminal 404, while the second terminal of the second switch 422 may be connected to the negative DC terminal 406. The control terminals of the switches 420 and 422 receive generally complementary inverter PWM signals from the motor control module 260.

The switch block 402 may include one or more additional inverter legs. In various implementations, the switch block 402 may include one inverter leg for each phase or winding of the motor 400. For example only, the switch block 402 may include second and third inverter legs 430 and 440, as shown in FIG. 4a. The inverter legs 410, 430, and 440 may provide current to windings 450, 452, and 454 of the motor 400, respectively. The windings 454, 452, and 450 may be referred to as windings a, b, and c, respectively. Voltage applied to the windings 454, 452, and 450 may be referred to as Va, Vb, and Vc, respectively. Current through the windings 454, 452, and 450 may be referred to as 1a, 1b, and 1c, respectively.

For example only, first ends of the windings 450, 452, and 454 may be connected to a common node. Second ends of the windings 450, 452, and 454 may be connected to the second terminal of the first switch 420 of the inverter legs 410, 430, and 440, respectively.

The inverter power module 208 may also include a shunt resistor 460 that is associated with the first inverter leg 410. The shunt resistor 460 may be connected between the second terminal of the second switch 422 and the negative DC terminal 406. In various implementations, respective shunt resistors may be located between each of the inverter legs 430 and 440 and the negative DC terminal 406. For example only, current through the first winding 450 of the motor 400 may be determined based on the voltage across the shunt resistor 460 of the first inverter leg 410. In various implementations, the shunt resistor of one of the inverter legs 410, 430, or 440 may be omitted. In such implementations, current may be inferred based on the measurements of the remaining shunt resistors.

Figure 4B:
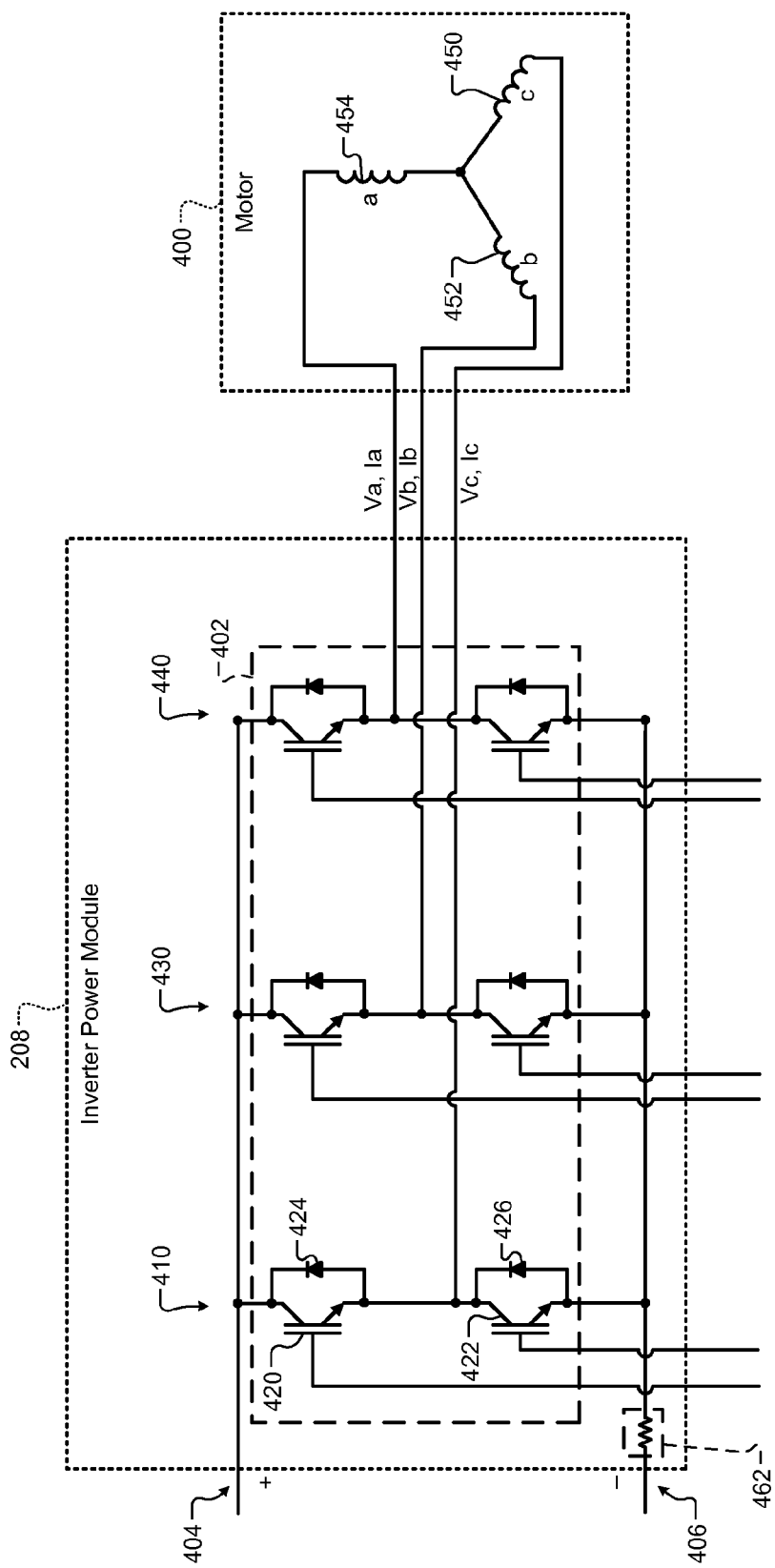
Figure 4C:
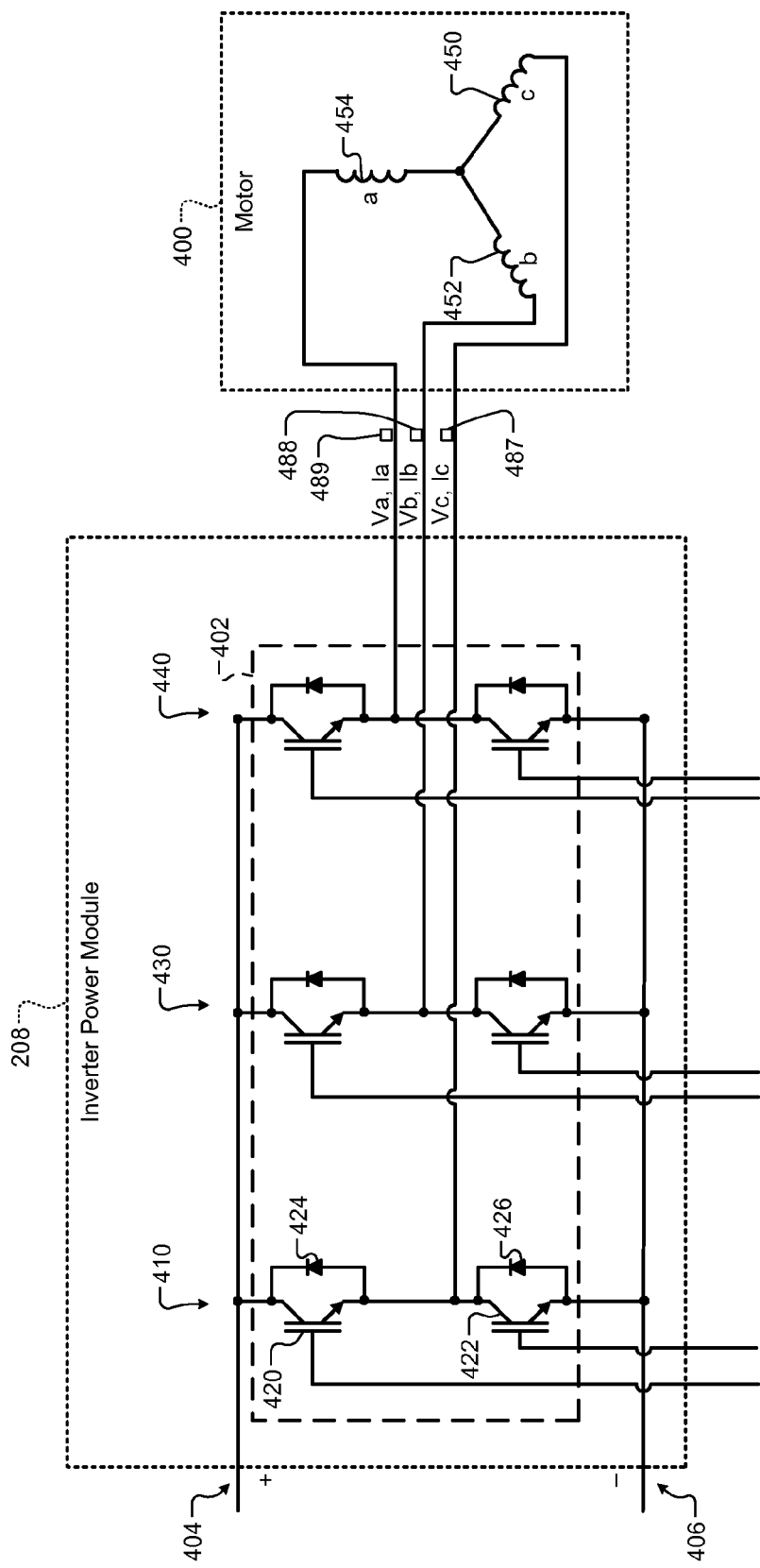

Additionally or alternatively, a resistor 462 may be connected in series with the negative DC terminal 406, as shown in FIG. 4b. Current through the resistor 462 may therefore indicate a total current consumed by the inverter power module 208. Current through each of the inverter legs 410, 430, and 440 may be inferred from the total current based on the known phase timing of the current through the inverter legs 410, 430, and 440. Further discussion of determining currents in an inverter can be found in commonly assigned U.S. Pat. No. 7,193,388, issued Mar. 20, 2007, which is incorporated by reference herein in its entirety.

Any method of measuring or sensing current through any or all of the inverter legs 410, 430, and 440 may be used. For example, in various implementations, the current through the first inverter leg 410 may be measured using a current sensor 487 (shown in FIG. 4c). For example only, the current sensor 487 may be implemented between the first inverter leg 410 and the first winding 450. Current through the inverter legs 430 and 440 may also be measured using associated current sensors 488 and 489, respectively. In various implementations, current sensors may be associated with two of the inverter legs 410, 430, and 440. The current through the other one of the inverter legs 410, 430, and 440 may be determined based on an assumption that the current in the motor windings sums to zero.

Figure 5:
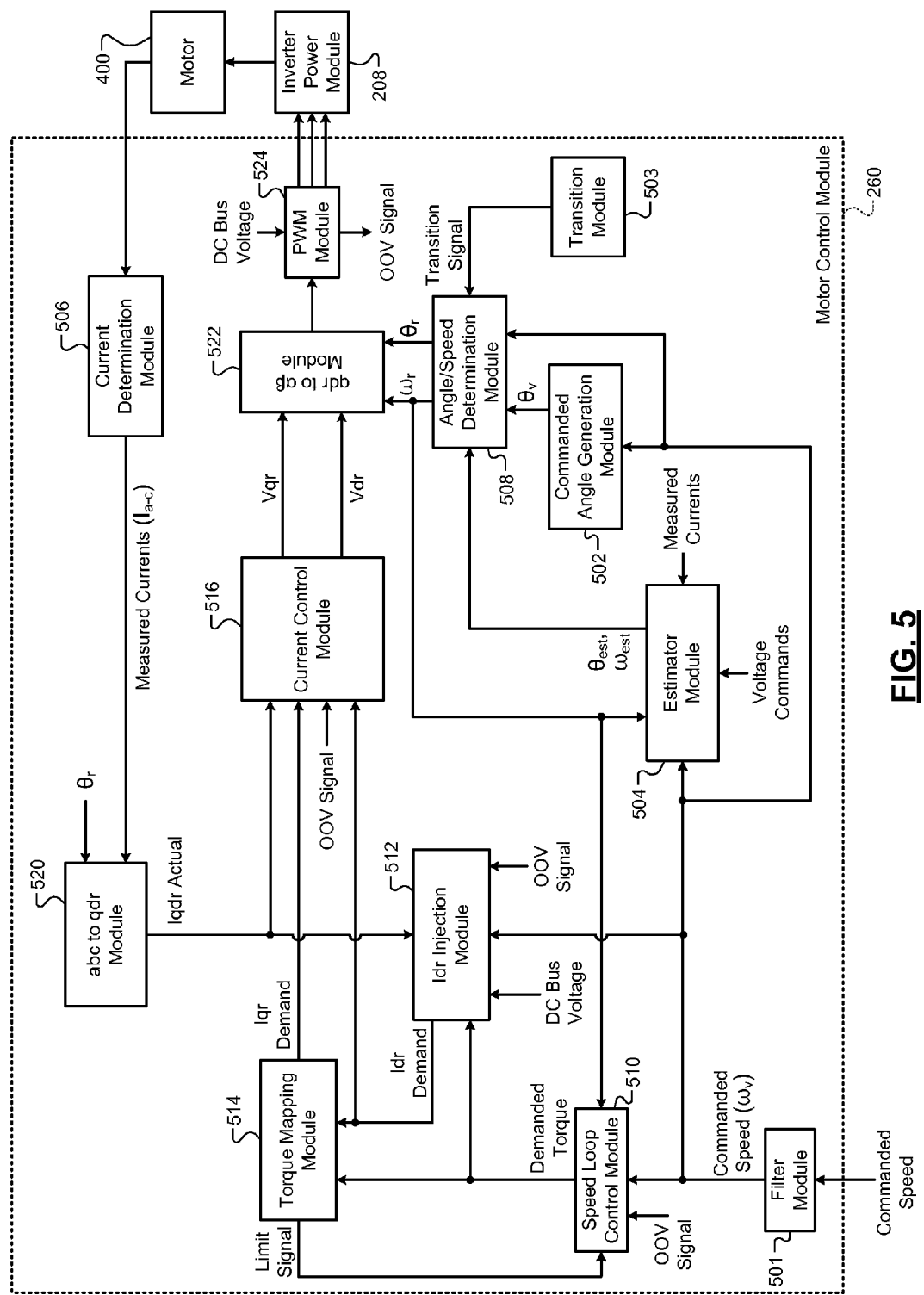
FIG. 5 is a functional block diagram of a motor control module according to the present disclosure.

Referring now to FIG. 5, an example implementation of the motor control module 260 of FIG. 2 is shown. The motor control module 260 controls switches within the inverter power module 208 to control voltages applied to the windings 454, 452, 450 (hereinafter, "windings$_{a-c}$") of the motor 400. This may also be referred to as controlling the inverter power module 208 or as controlling the motor 400.

For example, when the motor 400 includes a three-phase motor, the motor control module 260 may apply voltages V$_{a-c}$ to windings$_{a-c}$, respectively. Voltages V$_{a-c}$ may collectively be referred to as output voltages. Currents I$_{a-c}$ are generated in the windings$_{a-c}$, respectively, when voltages V$_a$, are applied to the windings$_{a-c}$. Currents I$_{a-c}$ may collectively be referred to as winding currents. Currents in the windings$_{a-c}$ produce magnetic flux about the windings$_{a-c}$, and vice versa. The motor control module 260 generates the output voltages to control the winding currents and/or to control magnetic flux.

The motor 400 includes a rotor (not shown) that rotates in response to the winding currents. The motor control module 260 controls the amplitude, duty cycle, and/or frequency of the output voltages to control the torque and speed of the rotor. The motor control module 260 may control the output voltages based on a commanded motor speed, which represents a desired rotational speed of the rotor.

The motor control module 260 may implement field oriented control of the motor 400. Accordingly, the motor control module 260 may map motor driving variables onto various frames of reference. Motor driving variables may include requested current/voltage values used to control the motor 400 as well as measured currents/voltages. For example, motor driving variables may include measured currents I$_{a-c}$ through the windings$_{a-c}$ and voltage requests used by the motor control module 260 to apply voltages V$_{a-c}$ to the windings$_{a-c}$.

The motor control module 260 may map motor driving variables in an abc frame of reference (FoR), an αβ FoR, and a qdr FoR. The abc FoR may represent, for example, a three-phase stator frame based on the windings$_{a-c}$. Each of the measured currents I$_{a-c}$ may be mapped onto respective axes a, b, and c of the abc FoR. Additionally, the motor control module 260 may map requested voltages corresponding to voltages V$_{a-c}$ in the abc FoR.

The αβ FoR includes stationary, stator-based x and y coordinates onto which the motor driving variables are projected. The qdr FoR is a rotating FoR that corresponds to the rotor and rotates in sync with the rotor. Accordingly, the qdr FoR is based on an angle of the rotor.

The motor control module 260 may transform motor driving variables from one FoR to another FoR. For example, the motor control module 260 may transform currents represented in the abc FoR into currents represented in the αβ FoR and vice versa. The motor control module 260 may transform motor driving variables from the abc FoR to the αβ FoR using a numerical transformation. The motor control module 260 may transform motor driving variables from the αβ FoR to the qdr FoR based on the angle of the rotor.

The motor control module 260 controls the inverter power module 208 based on the commanded speed from the supervisor control module 270 of FIG. 2. In various implementations, a filter module 501 may filter the commanded speed from the supervisor control module 270 of FIG. 2. In these implementations, the output of the filter module 501 is referred to below as the commanded speed $\omega_v$.

In open loop mode, the actual speed of the rotor will generally follow the commanded speed $\omega_v$, assuming that the commanded speed $\omega_v$ does not change too quickly. As a result, the coefficients of the low-pass filter of the filter module 501 may be chosen so that the rotor acceleration can keep up with changes in the commanded speed $\omega_v$ output from the filter module 501. Otherwise, rotor synchronization may be lost. In various implementations, the filter module 501 may implement a ramp function, which updates the commanded speed $\omega_v$ by up to a maximum increment during each predetermined interval of time.

The motor control module 260 may control the motor 400 based on a commanded FoR (e.g., a qdv FoR) when operating in open loop mode. The qdv FoR is associated with the commanded speed $\omega_v$ of the rotor and a commanded angle ($\theta_v$) of the rotor. A commanded angle generation module 502 may determine the commanded angle $\theta_v$, such as by integrating the commanded speed $\omega_v$.

The motor control module 260 may operate in various modes, such as open loop mode or a closed loop mode. For example only, the motor control module 260 may operate in open loop mode when starting the motor 400 and later transition to operating in closed loop mode. When operating in open loop mode, the rotor will tend to synchronize with the commanded speed $\omega_v$, especially when the motor control module 260 is operating the rotor at slower speeds. However, the actual rotor angle may differ from the commanded angle $\theta_v$ because of a load applied to the motor 400. For example, a change in load while operating in open loop mode may change a phase difference between the commanded angle $\theta_v$ and the actual rotor angle.

A transition module 503 determines when to transition the motor control module 260 from open loop mode to closed loop mode. For example only, the transition module 503 may determine when to transition based on at least one of the commanded speed $\omega_v$, an operating time of the motor 400, a commanded acceleration of the rotor, and/or feedback from an estimator module 504.

For example, the transition module 503 may predict the speed of the rotor based on the commanded acceleration and/or the operating time. The transition module 503 may transition from open to closed loop when the predicted speed is greater than a speed threshold. In various implementations, the transition module 503 may transition from open loop mode to closed loop mode when an elapsed time from when the motor 400 was started exceeds a predetermined period.

The estimator module 504 estimates the speed ($\omega_{est}$) and angle ($\theta_{est}$) of the rotor. The estimator module 504 may determine the estimated speed $\omega_{est}$ based on the estimated angle $\theta_{est}$. For example, the estimator module 504 may differentiate and filter the estimated angle $\theta_{est}$ over a period of time to determine the estimated speed $\omega_{est}$. The transition module 503 may transition from open to closed loop mode when the estimator module 504 has achieved stable estimates of the estimated angle $\theta_{est}$ and the estimated speed $\omega_{est}$. In various implementations, the transition module 503 may transition from open loop mode to closed loop mode when convergence in the estimator module 504 has occurred, which may be indicated by, for example, flux estimates.

Alternatively, the transition module 503 may transition from open loop mode to closed loop mode when the commanded speed $\omega_v$ is greater than the speed threshold. Alternatively or additionally, the transition module 503 may initiate a transition when the estimated speed $\omega_{est}$ of the rotor is greater than a predetermined speed. Other factors affecting when to perform the transition may include a load on the motor 400 and motor driving variables.

The estimator module 504 may determine the estimated angle $\theta_{est}$ based on various motor driving variables. For example, the motor driving variables may include $V_{a-c}$ to be applied to the windings$_{a-c}$ and $I_{a-c}$ measured in the windings$_{a-c}$. Additionally, the estimator module 504 may determine the estimated angle $\theta_{est}$ based on the commanded speed $\omega_v$. The estimator module 504 may implement a state observer (e.g., a Luenberger observer) to determine the estimated angle $\theta_{est}$ and the estimated speed $\omega_{est}$ based on the motor driving variables. Further description of sensorless control systems and methods can be found in U.S. Pat. Nos. 6,756,757, issued Jun. 29, 2004, 7,208,895, issued Apr. 24, 2007, 7,342,379, issued Mar. 11, 2008, and 7,375,485, issued May 20, 2008, which are incorporated herein by reference in their entirety.

A current determination module 506 may measure the currents $I_{a-c}$ of the windings$_{a-c}$ (hereinafter "measured currents"). The estimator module 504 may use the measured currents to estimate $\theta_{est}$ and $\omega_{est}$.

An angle/speed determination module 508 generates an output angle $\theta_r$ and an output speed $\omega_r$ based on the currently enabled mode, such as open loop mode or closed loop mode. The angle/speed determination module 508 may set the output angle $\theta_r$ equal to the commanded angle $\theta_v$ when operating in open loop mode and may set the output angle $\theta_r$ equal to the estimated angle $\theta_{est}$ when operating in closed loop mode.

When the transition module 503 instructs a transition from open loop mode to closed loop mode, the angle/speed determination module 508 gradually adjusts the output angle $\theta_r$ from the commanded angle $\theta_v$ to the estimated angle $\theta_{est}$. This gradual adjustment may minimize transient current demands when transitioning from open loop mode to closed loop mode, which may prevent disruption of current control (described below) and/or estimation of the estimated angle $\theta_{est}$. The gradual adjustment may therefore improve stability during transitions and allow for starting the motor 400 more reliably, especially under higher loads.

The angle/speed determination module 508 may set the output speed $\omega_r$ equal to the commanded speed $\omega_v$ when operating in open loop mode. The angle/speed determination module 508 may set the output speed $\omega_r$ equal to the estimated speed $\omega_{est}$ when operating in closed loop mode. In various implementations, the angle/speed determination module 508 may immediately switch the output speed $\omega_r$ from the commanded speed $\omega_v$ to the estimated speed $\omega_{est}$ when the transition module 503 instructs a transition from open loop mode to closed loop mode.

The transition module 503 may also instruct a change from closed loop mode back to open loop mode. For example only, a transition back to open loop mode may be performed when error conditions, such as a lost rotor, or abnormal operating conditions, are observed. The angle/speed determination module 508 may therefore also switch the output speed $\omega_r$ from the estimated speed $\omega_{est}$ back to the commanded speed $\omega_v$, and switch the output angle $\theta_r$ from the estimated angle $\theta_{est}$ back to the commanded angle $\theta_v$. In various implementations, similarly to the transition from open loop mode to closed loop mode, switching the output speed $\omega_r$ may be performed immediately, while switching the output angle $\theta_r$ may be performed gradually.

In various implementations, additional modes may be supported. For example only, three, four, or more modes may be supported. The transition module 503 may instruct the angle/speed determination module 508 to transition from one of the modes to another. During each transition, the angle/speed determination module 508 may switch the output speed $\omega_r$ immediately to a speed corresponding to the selected mode. Alternatively, the output speed $\omega_r$ may be ramped toward the speed of the selected mode. Further, the angle/speed determination module 508 ramps the output angle $\theta_r$ toward an angle corresponding to the selected mode. The transition module 503 may instruct the angle/speed determination module 508 to transition from one of the modes to another using a transition signal. For example, the transition signal may specify a target mode to which the angle/speed determination module 508 should transition.

A speed loop control module 510 generates a demanded torque signal calculated to match the output speed $\omega_r$ to the commanded speed $\omega_v$. In various implementations, the speed loop control module 510 may be bypassed in open loop mode. In closed loop mode, the output speed $\omega_r$ is equal to the estimated speed $\omega_{est}$ of the motor 400. Therefore, the speed loop control module 510 may generate the demanded torque signal in order to keep the speed of the motor 400 approximately equal to the commanded speed $\omega_v$. For example only, when the output speed $\omega_r$ is less than the commanded speed $\omega_v$, the speed loop control module 510 may increase the demanded torque, and vice versa.

An Idr injection module 512 generates a d-axis current (Idr) demand based on the DC bus voltage, the demanded torque signal, and the commanded speed $\omega_v$. The Idr demand is used by current control, described below, for Idr injection, which may also be referred to as field weakening or phase advance. In various implementations, the Idr injection module 512 may adjust the Idr demand based on an out of volts (OOV) signal, described below, and measured current.

A torque mapping module 514 generates a q-axis current (Iqr) demand based on the demanded torque signal. Torque may also be generated by the Idr demand and therefore, the torque mapping module 514 may determine the Iqr demand based also on the Idr demand. For example only, the torque mapping module 514 may implement a maximum current limit. In various implementations, the torque mapping module 514 may compare a combination of the Idr demand and the Iqr demand to the maximum current limit, and reduce one or both of the demands when the combination exceeds the maximum current limit. In various implementations, the torque mapping module 514 may limit only the Iqr demand. For example only, the maximum current limit may be a root mean square limit, such as 25 $Amps_{rms}$.

When the torque mapping module 514 is limiting the Iqr demand to meet the maximum current limit, the torque mapping module 514 may output a limit signal to the speed loop control module 510. When the limit signal is received, the speed loop control module 510 may temporarily suspend increasing the demanded torque. In addition, the speed loop control module 510 may also temporarily suspend increasing the demanded torque based on the OOV signal.

For example only, the speed loop control module 510 may attempt to match the output speed $\omega_r$ to a reduced version of the commanded speed $\omega_v$. Alternatively or additionally, the speed loop control module 510 may selectively suspend error summing and/or integrating operation that would lead to increasing the demanded torque. In other words, when the torque mapping module indicates, via the limit signal, that the maximum current limit is reached, the speed loop control module 510 may stop increasing the demanded torque because the present demanded torque already cannot be achieved within the maximum current limit.

A current control module 516 determines voltage commands Vqr and Vdr, in the qdr FoR, based on the current demands Iqr and Idr. The voltage commands Vqr and Vdr may be a q-axis voltage command and a d-axis voltage command, respectively. In various implementations, the current control module 516 may determine the voltage commands Vqr and Vdr based also on the measured currents. In various implementations, the current control module 516 may attempt to match the measured currents to the Iqr and Idr demands by adjusting the voltage commands Vqr and Vdr. In various implementations, the current control module 516 may also receive the output speed $\omega_r$.

An abc to qdr module 520 maps the measured currents $I_{a-c}$ onto the qdr FoR based on the output angle $\theta_r$. The resulting mapped current may be referred to as Iqdr, and may include Iqr and Idr components. The measured currents used by components of the motor control module 260, such as the current control module 516, may therefore use the Iqdr representation of the measured currents.

A qdr to αβ module 522 may transform the voltage commands Vqr and Vdr from the qdr FoR to the αβ FoR, thereby generating a voltage request in the αβ FoR (hereinafter "voltage request"). The voltage request may indicate the voltages to be applied to the windings$_{a-c}$. The qdr to αβ module 522 may perform the transformation based on the output angle $\theta_r$, and in various implementations, may perform the transformation based on the output speed $\omega_r$.

A pulse-width modulation (PWM) module 524 generates duty cycle signals to control the inverter power module 208 using PWM. For example only, the PWM switching frequency may be approximately 5 kHz or approximately 10 kHz. In various implementations, the inverter power module 208 and the motor 400 have three phases, and the PWM module 524 generates three duty cycle signals, one for each inverter leg.

In various implementations, each leg of the inverter power module 208 includes a pair of complementary switches, and each of the duty cycle signals is therefore converted into complementary duty cycle signals, one for each of the complementary switches. For example only, referring to FIG. 4a, the switch 420 and the switch 422 of the first inverter leg 410 may be controlled with complementary duty cycles.

In various implementations, to prevent a short circuit condition, where both the switches 420 and 422 are on simultaneously, the complementary duty cycles may be adjusted so that a switch is not turning on at the same time the other switch is turning off. In other words, the off-times of the two switches are partially overlapped.

The PWM module 524 determines the duty cycle signals based on the DC bus voltage and the voltage requests from the qdr to αβ module 522. For example only, the PWM module 524 may transform the voltage request from the αβ FoR to the abc FoR to determine three voltage demands, hereinafter $Vr_a$, $Vr_b$, and $Vr_c$ (collectively $Vr_{a-c}$), corresponding to the windings$_{a-c}$, respectively.

When the voltage demands can not be met given the present DC bus voltage, the drive controller 132 is defined to be operating in the OOV state. For example only, a maximum duty cycle may be defined in the PWM module 524. If the voltage demands would result in one of the duty cycles being greater than the maximum duty cycle, the drive controller 132 is operating in the OOV state.

In various implementations, the maximum duty cycle may be set to be less than 100%, such as 96%, 95%, or 92%. The maximum duty cycle limit may be set based on requirements for accurate measurement of the winding currents $I_{a-c}$. A corresponding minimum duty cycle limit may also be defined. For example only, the minimum duty cycle limit may be equal to one minus the maximum duty cycle limit.

In various implementations, the motor 400 may respond not to the winding voltages themselves, but instead to differences between the winding voltages. As a simplistic example, applying 50 Volts to a first winding and 150 Volts to a second winding may be equivalent to applying 0 Volts to the first winding and 100 Volts to the second winding. Therefore, even if one of the voltage demands may exceed an available voltage, the PWM module 524 may shift the voltage demands when generating the duty cycles.

In such implementations, the PWM module 524 may determine that the drive controller 132 is in the OOV state when a difference between any two of the three voltage demands is greater than the available voltage. For example only, the available voltage may be equal to the DC bus multiplied by the maximum duty cycle. In various implementations, the PWM module 524 may shift the duty cycles such that one of the duty cycles is set to zero. Alternatively, the PWM module 524 may shift the duty cycles such that the duty cycles are centered about a middle duty cycle, such as 50%. In various implementations, the PWM module 524 may shift the duty cycles using one or the other of these approaches, depending on an operating mode. For example only, the PWM module 524 may shift the duty cycles such that the lowest duty cycle is set to zero when the motor 400 is operating at speeds above a predetermined threshold.

In the OOV state, the difference between the duty cycles corresponding to the voltage demands is greater than the difference between the minimum and maximum duty cycles. Therefore, when operating in the OOV state, the PWM module 524 may scale the voltage demands down before generating the duty cycles. Equivalently, the PWM module 524 may scale the duty cycles. In various implementations, the PWM module 524 may scale the duty cycles or voltage demands as little as possible, such that one of the duty cycles is set to the minimum duty cycle, and one of the duty cycles is set to the maximum duty cycle.

The scaling factor is an indication of how far OOV the drive controller 132 currently is. The scaling factor may be referred to as OOV magnitude, and may be included in the OOV signal. In the OOV state, the PWM module 524 sets an OOV flag to a first value, such as 1. When not in the OOV state, the PWM module 524 sets the OOV flag to a second value, such as 0. The OOV flag may be included in the OOV signal.

An OOV amount may be determined based on the OOV flag. For example only, the OOV amount may indicate how often the drive controller 132 is operating OOV. For purposes of illustration only, the inverter power module 208 may define an operating region shaped like a hexagon. The voltage demands may be thought of as circles within the hexagon. If the circles are centered within the hexagon, as the circles expand, they will touch the sides of the hexagon. When the circles expand beyond the hexagon, the circles become more and more clipped at each face of the hexagon. Clipping may correspond to the OOV state. As a result, the proportion of time that the voltage demands are clipping (producing the OOV state) indicates how far OOV the driver controller 132 is.

The OOV amount may represent a portion of the time that the drive controller 132 is spending in the OOV state. The OOV amount may be determined by applying a filter, such as a digital low-pass filter, to the OOV flag. For example only, the OOV amount may be determined by applying a moving average to the OOV flag. When the OOV flag assumes values of 0 or 1, the OOV amount will then range between 0 and 1, inclusive. When multiplied by 100, the OOV amount is the percentage of time the drive controller 132 is spending in the OOV state.

The motor control module 260 may use multiple approaches to minimize OOV operation, or to maintain OOV operation below a predetermined threshold. In various implementations, the Idr injection module 512 may use the OOV amount in determining how to adjust the Idr demand. The speed loop control module 510 may also use the OOV amount to determine when to suspend increases in the demanded torque. The current control module 516 may suspend increases to one or both of the Vqr and Vdr commands based on the OOV flag.

Figure 6:
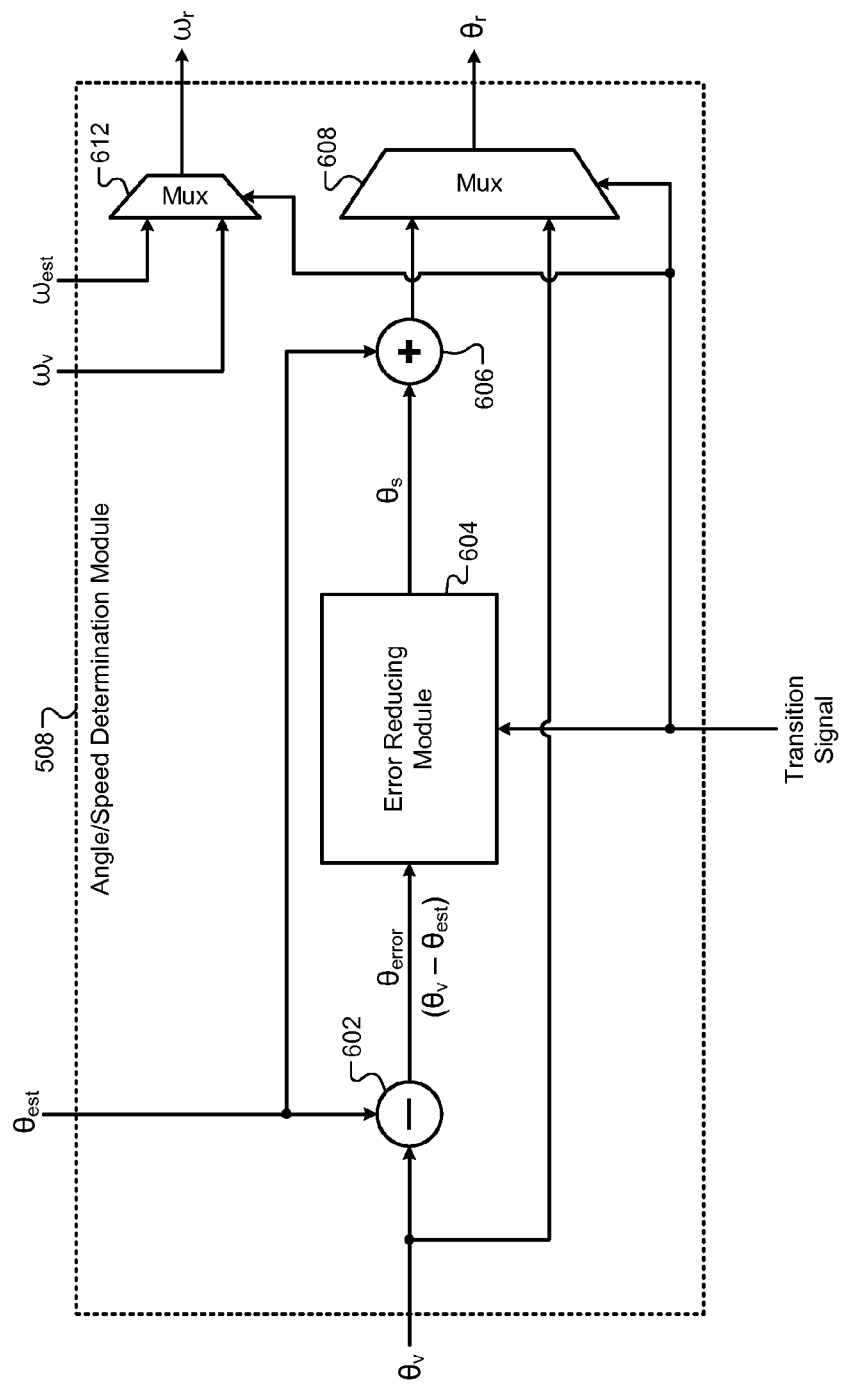
FIG. 6 is a functional block diagram of an angle determination module according to the present disclosure.

Referring now to FIG. 6, an example implementation of the angle/speed determination module 508 includes a subtraction module 602, an error reducing module 604, a summing module 606, a first multiplexing module 608, and a second multiplexing module 612. During open loop mode, the transition signal from the transition module 503 instructs the first multiplexing module 608 to output the commanded angle $\theta_v$ as the output angle $\theta_r$. When transitioning from open loop mode to closed loop mode, the transition signal instructs the first multiplexing module 608 to output a sum from the summing module 606 as the output angle $\theta_r$. This sum will eventually be equal to the estimated angle $\theta_{est}$.

However, at the time of the transition, the commanded angle $\theta_v$ and the estimated angle $\theta_{est}$ may not be equal. In order to avoid discontinuities in the output angle $\theta_r$ at the time of the transition, the sum from the summing module 606 is controlled to be equal to the commanded angle $\theta_v$. This may be done by calculating the difference ($\theta_{error}$) between the commanded angle $\theta_v$ and the estimated angle $\theta_{est}$, and adding the angle error $\theta_{error}$ to the estimated angle $\theta_{est}$. The estimated angle $\theta_{est}$ that is added cancels with the estimated angle $\theta_{est}$ that was subtracted, and the result is still the commanded angle $\theta_v$ at the time of the transition. The subtraction module 602 generates the angle error $\theta_{est}$.

The error reducing module 604 stores the value of angle error $\theta_{error}$ at the time of the transition, and, over time, reduces the absolute value of the stored value to zero. The stored value is output from the error reducing module 604 as $\theta_s$. When the stored value reaches zero, the sum from the summing module 606 will be equal to the estimated angle $\theta_{est}$, and the transition is complete.

In various implementations, the error reducing module 604 may decrement the magnitude of the stored value by predetermined increments at predetermined intervals until the stored value reaches zero. In other words, the error reducing module 604 decreases the magnitude of $\theta_s$ when decrementing $\theta_s$, regardless of the sign of $\theta_s$. For example, the error reducing module 604 may subtract the predetermined increment from $\theta_s$ when $\theta_s$ is a positive value. The error reducing module 604 may add the predetermined increment to $\theta_s$ when $\theta_s$ is a negative value. For example only, the error reducing module 604 may decrement the magnitude of $\theta_s$ by 0.5 degrees at 100 μs intervals until $\theta_s$ reaches zero.

During open loop mode, the transition signal instructs the second multiplexing module 612 to output $\omega_v$ as $\omega_r$. When transitioning from open loop mode to closed loop mode, the transition signal instructs the second multiplexing module 612 to output $\omega_{est}$ as $\omega_r$. In normal operation, $\omega_{est}$ and $\omega_v$ will be equal, and therefore switching directly from one to the other will not result in an abrupt change in $\omega_r$.

Figure 7:
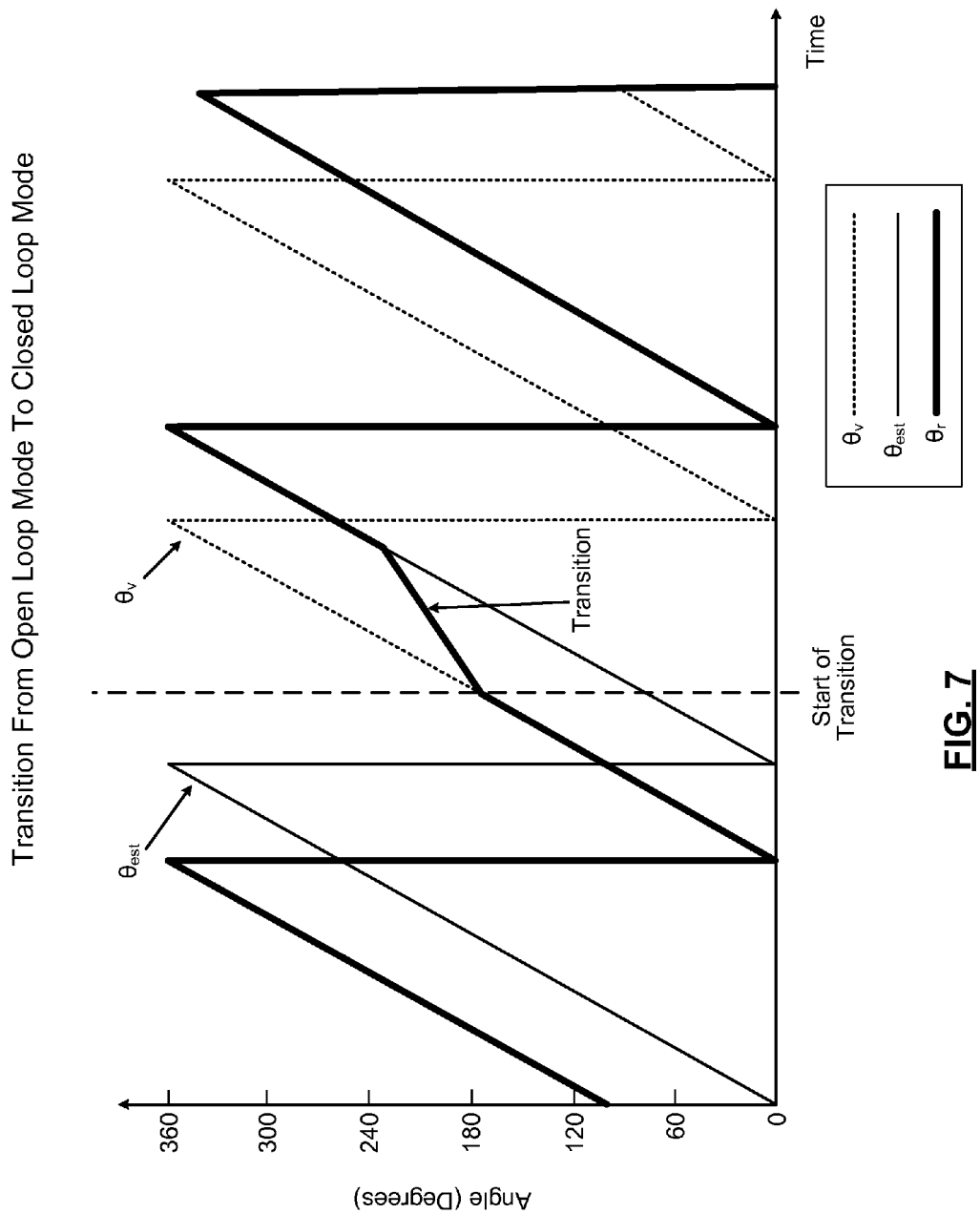
FIG. 7 illustrates a transition from open loop operation to closed loop operation according to the present disclosure.

Referring now to FIG. 7, an example transition from open loop mode to closed loop mode is graphically illustrated. The thin dashed line tracks the commanded angle $\theta_v$ used in open loop mode. The thin solid line tracks the estimated angle $\theta_{est}$ used in closed loop mode. The bold line is the output of the angle/speed determination module 508, the output angle $\theta_r$. The output angle $\theta_r$ follows the commanded angle $\theta_v$ until the beginning of the transition from open loop mode to closed loop mode. The output angle $\theta_r$ then ramps toward the estimated angle $\theta_{est}$. In actuality, as soon as the start of the transition occurs, the output angle $\theta_r$ is following the estimated angle $\theta_{est}$. However, the output angle $\theta_r$ is following the estimated angle $\theta_{est}$ plus an offset ($\theta_s$). That offset is reduced over the course of the transition. When the offset reaches zero, the output angle $\theta_r$ follows the estimated angle $\theta_{est}$ for the remainder of FIG. 7.

While the merging system is described as controlling a transition from the commanded angle $\theta_v$ in open loop mode to the estimated angle $\theta_{est}$ in closed loop mode, the merging system may be generally applicable to transitioning between any two motor control angles. For example, when a first sensorless control system controls based on a first angle ($\theta_1$) and a second sensorless control system controls based on a second angle ($\theta_2$), the merging system may control a transition from $\theta_1$ to $\theta_2$ when control transitions from the first to the second sensorless control system. Alternatively, the merging system may control a transition from $\theta_2$ to $\theta_1$ when control switches from the second sensorless control system to the first sensorless control system.

The first sensorless control system may be a system that controls the rotor in a first speed range, while the second sensorless control system may be a system that controls the rotor in a second speed range. Accordingly, the merging system may transition between $\theta_1$ and $\theta_2$ based on the speed of the rotor. In some implementations, the merging system may control a transition from open loop mode to the first sensorless control system, then control transitions between the first sensorless control system and the second sensorless control system based on the speed of the rotor. The merging system may control transitions from any one of N modes to another of N modes, where N is an integer greater than or equal to 2. For example only, N may be equal to 2, 3, 4, or more.

Figure 8:
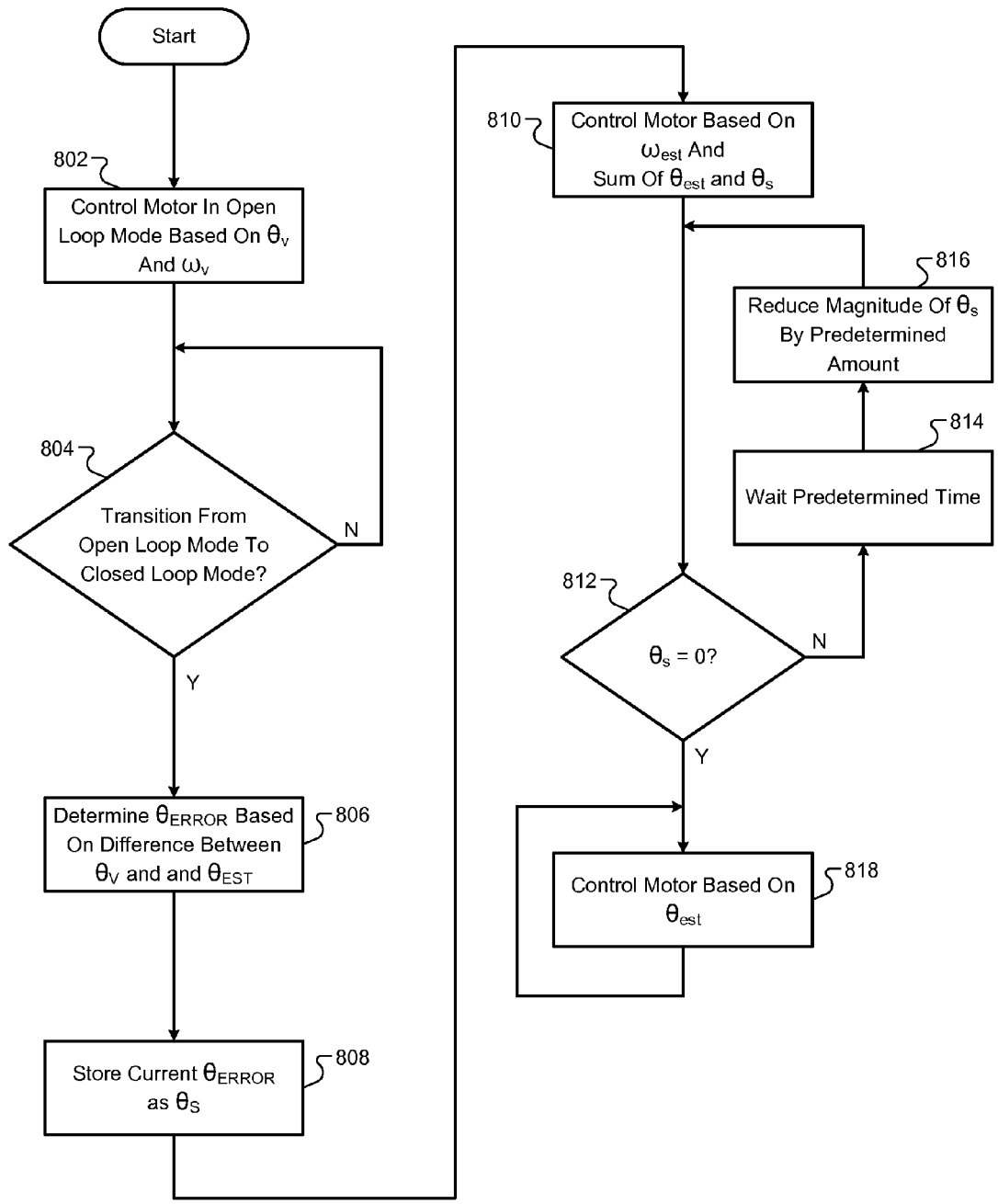
FIG. 8 illustrates a method for transitioning from open loop operation to closed loop operation according to the present disclosure.

Referring now to FIG. 8, a method for transitioning from open loop mode to closed loop mode begins in 802. In 802, control operates the motor 400 in open loop mode based on the commanded angle $\theta_v$ and $\omega_v$. In 804, control determines whether to transition from open loop mode to closed loop mode. If true, control proceeds to 806; otherwise, control remains in 804. In 806, control calculates the angle error $\theta_{error}$ based on a difference between the commanded angle $\theta_v$ and the estimated angle $\theta_{est}$. In 808, control stores the angle error $\theta_{error}$ as $\theta_s$.

In 810, control operates the motor 400 based on $\omega_{est}$ and the sum of $\theta_{est}$ and $\theta_s$. Because processing is not instantaneous, 810 is technically performed after the transition from open loop to closed loop has been instructed by 804. However, the delay may be negligible. In 812, control determines whether $\theta_s$ is equal to zero. If false, control proceeds to 814. If true, control proceeds to 818. In 814, control waits for a predetermined interval. In 816, control decrements the magnitude of $\theta_s$ by a predetermined amount and returns to 812. In 818, control operates the motor 400 based on $\omega_{est}$ and the estimated angle $\theta_{est}$. Control remains in 818. However, if an error occurs, control may return (not shown) to 802. Operating in open loop mode may allow recovery from error conditions.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
  a control module that controls a motor based on a first rotor angle;
  an angle determination module that generates the first rotor angle;
  an estimator module that determines an estimated rotor angle of the motor; and
  a transition module that generates a transition signal in response to convergence of the estimator module, wherein:
  the angle determination module initially generates the first rotor angle based on an open loop angle,
  in response to the transition signal, the angle determination module switches to generating the first rotor angle based on the estimated rotor angle and an offset value, and
  the offset value is based on a difference between the estimated rotor angle and the open loop angle at the time when the transition signal is generated.

2. The system of claim 1 wherein, over a time period subsequent to the time when the transition signal is generated, the angle determination module reduces a magnitude of the offset to zero.

3. The system of claim 2 wherein the angle determination module reduces the magnitude of the offset, at periodic intervals, by a predetermined amount.

4. The system of claim 1 wherein the angle determination module generates the first rotor angle based on the estimated rotor angle and the offset value by summing the estimated rotor angle and the offset value.

5. The system of claim 1 wherein the transition module judges the convergence of the estimator module based on flux estimates generated by the estimator module.

6. The system of claim 1 further comprising a commanded angle generation module that generates the open loop angle based on a commanded speed.

7. The system of claim 6 wherein the commanded angle generation module generates the open loop angle by integrating the commanded speed.

8. The system of claim 1 wherein the estimator module determines the estimated rotor angle based on measured parameters of the motor, wherein the measured parameters include at least one of measured currents and measured voltages.

9. The system of claim 1 wherein the estimator module determines an estimated speed of the motor, and wherein the control module controls the switching based on the first rotor angle and the estimated speed in response to the transition signal.

10. The system of claim 9 wherein the transition module also generates the transition signal in response to
  (i) the estimated speed being greater than a predetermined speed, and
  (ii) the motor having run for longer than a predetermined period of time.

11. A method of operating a motor, the method comprising:
  controlling the motor based on a first rotor angle;
  using an estimator, determining an estimated rotor angle of the motor;
  generating a transition signal in response to convergence of the estimator;
  initially generating the first rotor angle based on an open loop angle; and
  in response to the transition signal, switching to generating the first rotor angle based on the estimated rotor angle and an offset value, wherein the offset value is based on a difference between the estimated rotor angle and the open loop angle at the time when the transition signal is generated.

12. The method of claim 11 further comprising, over a time period subsequent to the time when the transition signal is generated, reducing a magnitude of the offset to zero.

13. The method of claim 12 further comprising reducing the magnitude of the offset, at periodic intervals, by a predetermined amount.

14. The method of claim 11 further comprising generating the first rotor angle based on the estimated rotor angle and the offset value by summing the estimated rotor angle and the offset value.

15. The method of claim 11 further comprising judging the convergence of the estimator based on flux estimates generated by the estimator.

16. The method of claim 11 further comprising generating the open loop angle based on a commanded speed.

17. The method of claim 16 further comprising generating the open loop angle by integrating the commanded speed.

18. The method of claim 11 further comprising determining the estimated rotor angle based on measured parameters of the motor, wherein the measured parameters include at least one of measured currents and measured voltages.

19. The method of claim 11 further comprising:
  determining an estimated speed of the motor; and
  in response to the transition signal, controlling the switching based on the first rotor angle and the estimated speed.

20. The method of claim 19 further comprising:
  generating the transition signal in response to the estimated speed being greater than a predetermined speed; and
  generating the transition signal in response to the motor having run for longer than a predetermined period of time.

* * * * *

UNITED STATES PATENT AND TRADEMARK OFFICE
CERTIFICATE OF CORRECTION

PATENT NO. : 8,547,051 B2
APPLICATION NO. : 13/585961
DATED : October 1, 2013
INVENTOR(S) : Charles E. Green et al.

It is certified that error appears in the above-identified patent and that said Letters Patent is hereby corrected as shown below:

| | |
|---|---|
| Title Page, Column 2, Other Publications, Line 2 | Delete "Electrionics" and insert --Electronics--. |
| Title Page, Column 2, Other Publications, Line 4 | Delete "2007." and insert --2007,--. |
| Title Page 2, Column 2, Other Publications, Line 17 | Delete "Seach" and insert --Search--. |
| Title Page 3, Column 1, Other Publications, Line 8 | Before "Apr. 21, 2011.", insert --mailed--. |
| Title Page 3, Column 1, Other Publications, Line 23 | Delete "Interieved" and insert --Interleaved--. |
| Title Page 3, Column 2, Other Publications, Line 16 | Delete "J.E.," and insert --J. E.,--. |
| Title Page 3, Column 2, Other Publications, Line 18 | Delete "627-633,2002" and insert --627-633, 2002.--. |
| Title Page 3, Column 2, Other Publications, Line 18 | Delete "10.1109/INTLEC" and insert --10.11.09/INTELEC--. |

In the Drawings

| | |
|---|---|
| Sheet 12 of 12, Reference Numeral 806, Fig. 8, Line 1 | Delete "$\theta_{ERROR}$" and insert --$\theta_{error}$--. |
| Sheet 12 of 12, Reference Numeral 806, Fig. 8, Line 3 | Delete "$\theta_V$" and insert --$\theta_v$--. |
| Sheet 12 of 12, Reference Numeral 806, Fig. 8, Line 3 | Delete "$\theta_{EST}$" and insert --$\theta_{est}$--. |
| Sheet 12 of 12, Reference Numeral 808, Fig. 8, Line 1 | Delete "$\theta_{ERROR}$" and insert --$\theta_{error}$--. |
| Sheet 12 of 12, Reference Numeral 808, Fig. 8, Line 2 | Delete "$\theta_S$" and insert --$\theta_s$--. |

Signed and Sealed this
First Day of April, 2014

Michelle K. Lee
*Deputy Director of the United States Patent and Trademark Office*

CERTIFICATE OF CORRECTION (continued)
U.S. Pat. No. 8,547,051 B2

In the Specifications

| | |
|---|---|
| Column 3, Detailed Description, Line 47 | Delete "logical or" and insert --logical OR--. |
| Column 9, Detailed Description, Line 21 | Delete "resisters" and insert --resistors--. |
| Column 11, Detailed Description, Line 4 | Delete "1a, 1b, and 1c" and insert --Ia, Ib, and Ic--. |
| Column 11, Detailed Description, Line 59 | Delete "$V_a$" and insert --$V_{a-c}$--. |
| Column 18, Detailed Description, Line 4 | Delete "$\theta_{est.}$" arid insert --$\theta_{ERROR.}$--. |
| Column 19, Detailed Description, Line 6 | Before "$\omega_v$", insert --commanded speed--. |